(12) United States Patent
Nakajima et al.

(10) Patent No.: US 8,271,718 B2
(45) Date of Patent: Sep. 18, 2012

(54) STORAGE SYSTEM AND CONTROL METHOD FOR THE SAME, AND PROGRAM

(75) Inventors: Noriko Nakajima, Machida (JP); Yuichi Taguchi, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 594 days.

(21) Appl. No.: 12/311,557

(22) PCT Filed: Mar. 11, 2009

(86) PCT No.: PCT/JP2009/001083
§ 371 (c)(1),
(2), (4) Date: Apr. 3, 2009

(87) PCT Pub. No.: WO2010/103569
PCT Pub. Date: Sep. 16, 2010

(65) Prior Publication Data
US 2011/0029739 A1 Feb. 3, 2011

(51) Int. Cl.
*G06F 9/26* (2006.01)
(52) U.S. Cl. .................................. 711/103; 711/209
(58) Field of Classification Search .................. 711/103, 711/209, 324
See application file for complete search history.

(56) References Cited

U.S. PATENT DOCUMENTS

| 6,928,526 | B1 | 8/2005 | Zhu et al. |
| 7,908,436 | B1* | 3/2011 | Srinivasan et al. ............ 711/114 |
| 2003/0224734 | A1 | 12/2003 | Takekawa et al. |
| 2008/0307191 | A1 | 12/2008 | Lane et al. |
| 2009/0063883 | A1* | 3/2009 | Mori ............................. 713/324 |
| 2009/0089483 | A1* | 4/2009 | Tanaka et al. ................. 711/103 |
| 2010/0199065 | A1* | 8/2010 | Kaneda ......................... 711/209 |

FOREIGN PATENT DOCUMENTS
EP 2 031 494 A2 1/2008

OTHER PUBLICATIONS
International Search Report mailed Oct. 6, 2009.

* cited by examiner

*Primary Examiner* — Hoai V Ho
*Assistant Examiner* — Pablo Huerta
(74) *Attorney, Agent, or Firm* — Stites & Harbison, PLLC; Juan Carlos A. Marquez, Esq.

(57) ABSTRACT

The present invention provides a criterion for determining whether or not to apply de-duplication processing. That is, by setting a reduction effect threshold to control switching the de-duplication between ON and OFF, the present invention allows operation such that the de-duplication is applied for a volume for which a high capacity-reduction effect is provided by the de-duplication processing, and in contrast, the de-duplication is not applied to maintain performance for a volume for which a low capacity-reduction effect is provided by the de-duplication processing.

14 Claims, 23 Drawing Sheets

FIG. 6

| LOGICAL STORAGE AREA IDENTIFICATION INFORMATION | RAID GROUP IDENTIFICATION INFORMATION | STARTING BLOCK ADDRESS | ENDING BLOCK ADDRESS |
|---|---|---|---|
| LD-01 | RG-01 | 0x0001 | 0x0030 |
| LD-02 | RG-01 | 0x0001 | 0x0030 |
| LD-03 | RG-02 | 0x0001 | 0x0030 |
| LD-04 | RG-03 | 0x0001 | 0x0030 |
| ... | ... | ... | ... |

FIG. 7

| COMMUNICATION INTERFACE IDENTIFICATION INFORMATION | LOGICAL STORAGE UNIT IDENTIFICATION INFORMATION | LOGICAL STORAGE AREA IDENTIFICATION INFORMATION |
|---|---|---|
| 50:00:01:1E:0A:E8:02 | LU-01 | LD-01 |
| 50:00:01:1E:0A:E8:02 | LU-02 | LD-02 |
| 50:00:01:1E:0A:E8:02 | LU-03 | LD-03 |
| 50:00:01:1E:0A:E8:03 | LU-01 | LD-04 |
| 50:00:01:1E:0A:E8:03 | LU-02 | LD-05 |
| ... | ... | ... |

FIG. 8

| COPY-SOURCE LOGICAL STORAGE AREA IDENTIFICATION INFORMATION | COPY-DESTINATION INFORMATION | |
| --- | --- | --- |
| | VIRTUAL STORAGE AREA IDENTIFICATION INFORMATION | VIRTUAL STORAGE AREA POOL IDENTIFICATION INFORMATION |
| LD-01 | VD-01 | PL-01 |
| LD-02 | VD-02 | PL-01 |
| LD-03 | VD-03 | PL-01 |
| LD-04 | VD-04 | PL-02 |
| LD-05 | VD-05 | PL-03 |
| ... | ... | ... |

FIG. 9

| VIRTUAL STORAGE AREA POOL IDENTIFICATION INFORMATION | LOGICAL STORAGE AREA IDENTIFICATION INFORMATION |
| --- | --- |
| PL-01 | LD-21 |
| PL-01 | LD-22 |
| PL-01 | LD-23 |
| PL-01 | LD-24 |
| PL-02 | LD-25 |
| PL-02 | LD-26 |
| ... | ... |

FIG. 10

| VIRTUAL STORAGE AREA INFORMATION | | LOGICAL STORAGE AREA INFORMATION | |
|---|---|---|---|
| VIRTUAL STORAGE AREA IDENTIFICATION INFORMATION | BLOCK ADDRESS | LOGICAL STORAGE AREA IDENTIFICATION INFORMATION | BLOCK ADDRESS |
| VD-01 | 0x0010 | LD-21 | 0x0001 |
| VD-01 | 0x0020 | LD-21 | 0x0011 |
| VD-01 | 0x0030 | LD-22 | 0x0021 |
| VD-01 | 0x0040 | LD-22 | 0x0030 |
| VD-02 | 0x0020 | LD-22 | 0x0010 |
| VD-02 | 0x0030 | LD-24 | 0x0020 |
| VD-02 | 0x0100 | LD-24 | 0x0040 |
| VD-03 | 0x0010 | LD-22 | 0x0001 |
| VD-03 | 0x0001 | LD-23 | 0x0001 |
| ... | ... | ... | ... |

FIG. 11

| VIRTUAL STORAGE AREA IDENTIFICATION INFORMATION 10061 | DE-DUPLICATION STATUS 10062 |
|---|---|
| VD-01 | OFF |
| VD-02 | OFF |
| VD-03 | OFF |
| VD-04 | ON |
| VD-05 | ON |
| VD-06 | OFF |
| ... | ... |

| VIRTUAL STORAGE AREA IDENTIFICATION INFORMATION 10071 | REDUCTION EFFECT (%) 10072 |
|---|---|
| VD-01 | 40 |
| VD-02 | 30 |
| VD-03 | 60 |
| VD-04 | 20 |
| VD-05 | 50 |
| VD-06 | 60 |
| ... | ... |

| VIRTUAL STORAGE AREA POOL IDENTIFICATION INFORMATION | POOL UTILIZATION (%) |
|---|---|
| PL-01 | 30 |
| PL-02 | 40 |
| PL-03 | 60 |
| ... | ... |

FIG. 14

| STORAGE VOLUME IDENTIFICATION INFORMATION 30011 | STORAGE DEVICE IDENTIFICATION INFORMATION 30012 | COMMUNICATION INTERFACE IDENTIFICATION INFORMATION 30013 | LOGICAL STORAGE UNIT IDENTIFICATION INFORMATION 30014 |
|---|---|---|---|
| /data1 | /dev/sdc1 | 50:00:01:1E:0A:E8:01 | LU-01 |
| /data1 | /dev/sdc1 | 50:00:01:1E:0A:E8:01 | LU-02 |
| /data1 | /dev/sdc1 | 50:00:01:1E:0A:E8:01 | LU-03 |
| /data2 | /dev/sdc2 | 50:00:01:1E:0A:E8:02 | LU-01 |
| /data2 | /dev/sdc2 | 50:00:01:1E:0A:E8:02 | LU-02 |
| ... | ... | ... | ... |

| VIRTUAL STORAGE AREA IDENTIFICATION INFORMATION | THRESHOLD | REDUCTION EFFECT |
|---|---|---|
| VD-01 | 40 | 40 |
| VD-02 | 40 | 30 |
| VD-03 | 40 | 60 |
| VD-04 | 40 | 20 |
| VD-05 | 40 | 50 |
| VD-06 | 40 | 60 |
| ... | ... | ... |

FIG. 27

| COPY-SOURCE INFORMATION | | COPY-DESTINATION INFORMATION | |
|---|---|---|---|
| LOGICAL STORAGE AREA IDENTIFICATION INFORMATION | BLOCK ADDRESS | VIRTUAL STORAGE AREA IDENTIFICATION INFORMATION | BLOCK ADDRESS |
| LD-01 | 0x0010 | VD-01 | 0x0010 |
| LD-01 | 0x0020 | VD-01 | 0x0010 |
| LD-01 | 0x0030 | VD-01 | 0x0030 |
| LD-01 | 0x0040 | VD-01 | 0x0040 |
| LD-02 | 0x0020 | VD-02 | 0x0020 |
| LD-02 | 0x0030 | VD-02 | 0x0030 |
| LD-02 | 0x0100 | VD-02 | 0x0100 |
| LD-03 | 0x0010 | VD-03 | 0x0010 |
| LD-03 | 0x0001 | VD-03 | 0x0001 |
| ... | ... | ... | ... |

STORAGE SYSTEM AND CONTROL METHOD FOR THE SAME, AND PROGRAM

TECHNICAL FIELD

The present invention relates to storage systems and control methods for the same, and programs.

BACKGROUND ART

1) Storage Area Network (SAN)

A network that connects one or more computers and one or more external storage devices is called a storage area network (SAN). SAN is a computer system often used especially in the case where a plurality of computers cooperate to provide one function or where one or more computers share one mass storage device. An advantage of SAN is its high extensibility because of its easiness of later addition, deletion, and replacement of storage resources and computer resources.

2) Disk Array Device

Disk array devices are commonly used as external storage devices connected to a SAN. A disk array device is a device that includes many magnetic storage devices typified by hard disk drives.

A disk array device uses the RAID (Redundant Array of Independent Disks) technology to manage several magnetic storage devices as a set. This set of magnetic storage devices is called a RAID group. A RAID group forms one or more logical storage areas. A computer connected to a SAN performs input/output processing for these storage areas. When data is recorded in a storage area, the disk array device records redundant data in one or two of the magnetic storage devices that constitute the RAID group. At the occurrence of a failure in one of the magnetic storage devices, this redundant data advantageously allows the data to be recovered from the rest of the magnetic storage devices in the RAID group.

3) Thin Provisioning Technology

In conventional operation of a SAN, when storage volumes are mounted on a file system that is run by a host computer, an appropriate physical disk capacity needs to be statically pre-allocated. However, in such operation, a large number of steps such as stopping the system are required for increasing the capacity or for creating and deleting a volume.

As such, the thin provisioning technology has emerged. In this technology, rather than pre-allocating the physical disk capacity, storage volumes are provided in the host computer as virtual units. At the occurrence of a write operation from the host, an area is dynamically allocated from a storage resource pool. Since the predefined storage resource pool can be configured with a smaller capacity than a virtual volume, the efficiency of capacity usage is improved. In addition, since increasing the capacity of the pool does not affect the host computer, operation is simplified to reduce the management load.

4) De-Duplication Technology

This is a technology of writing data in volumes without duplication. In this processing, writing is performed in such a manner that data is recorded only if the same data as the data to be written is not stored in a write-target area. If the same data is stored, the data itself is not recorded and only the write location is recorded in metadata to avoid multiple storage of the same data. This provides an effect of reducing the used capacity compared to the case where all data is written.

A duplication check may be performed on a block basis, a file basis, and so on.

[Patent Citation 1]

U.S. Pat. No. 6,928,526

DISCLOSURE OF INVENTION

Technical Problem

Applying the de-duplication processing has an advantage of the ability to reduce the used capacity of the write-target storage area, while it has a disadvantage of taking more time for writing and reading compared to the case where the de-duplication is not applied.

Therefore, a desirable operation is as follows. For a volume for which a high capacity-reduction effect is provided by the de-duplication processing, the de-duplication processing is applied because the above advantage is big. In contrast, for a volume for which a low capacity-reduction effect is provided by the de-duplication processing, the de-duplication processing is not applied because the above advantage is small.

However, the above-described conventional art does not have a criterion for determining whether or not to apply the de-duplication processing. Therefore, it does not allow such operation as applying or not applying the de-duplication processing depending on the reduction effect.

The present invention has been made in view of such a situation and provides operation of a storage subsystem and/or system capable of appropriately applying the de-duplication processing by taking into account the advantage and disadvantage of the de-duplication processing.

Technical Solution

To solve the above-described problem, the present invention introduces an idea of a threshold for the capacity reduction effect provided by the de-duplication processing. This threshold is set in a management computer, for example. The management computer instructs a storage subsystem to set the de-duplication to ON for a volume whose capacity reduction effect is at or above the threshold, and in contrast, to set the de-duplication to OFF for a volume whose capacity reduction effect is below the threshold. The storage subsystem switches the de-duplication between ON and OFF according to the instruction from the management computer.

That is, a storage system according to the present invention includes: a storage subsystem (100) having a plurality of storage areas for storing data; and a management computer (500) controlling data writing to the plurality of storage areas of the storage subsystem. In this storage system, for each of the plurality of storage areas, the management computer (500) compares a capacity reduction effect where de-duplication processing for avoiding duplication of data writing in the storage subsystem (100) is set to ON with a predetermined threshold. The storage subsystem (100) switches the de-duplication processing between ON and OFF on a storage area basis based on a result of the comparison of the capacity reduction effect with the predetermined threshold.

More specifically, the storage subsystem (100) has a de-duplication application management table (1006) for managing current statuses of applying the de-duplication processing for the plurality of storage areas. Based on the de-duplication application management table (1006) and the comparison result, the de-duplication processing is switched between ON and OFF. Further specifically, if the de-duplication processing is set to OFF in the de-duplication application management table (1006) for a storage area for which the comparison result is determined as the threshold</=the capacity reduction effect, the storage subsystem (100) switches the de-duplication processing from OFF to ON for this storage area (</= means < or =.) If the de-duplication processing is set to ON in the de-duplication application management table (1006) for a storage area for which the comparison result is determined as the threshold>the capacity reduction effect, the storage subsystem (100) switches the de-duplication processing from ON to OFF for this storage area. When switching the de-duplication processing from OFF to ON, the storage subsystem (100) erases duplicate data in the storage area and replaces the data with NULL.

The management computer (500) has a threshold management table (5001) for managing information about the predetermined threshold and the capacity reduction effect for each of the plurality of storage areas. The storage subsystem (100) calculates the capacity reduction effect for each of the plurality of storage areas by using information about the number of entries of block addresses and information about the number of de-duplicated block addresses and notifies the management computer (500) of a result of the calculation with predetermined timing. The management computer (500) reflects the received calculation result in the threshold management table (5001).

Further features of the present invention will become apparent from the Best Mode for Carrying Out the Invention below and the accompanying drawings.

Advantageous Effects

According to the present invention, operation is possible such that the de-duplication is applied for a volume for which a high capacity-reduction effect is provided by the de-duplication processing, and in contrast, the de-duplication is not applied to maintain performance for a volume for which a low capacity-reduction effect is provided by the de-duplication processing.

BRIEF DESCRIPTION OF DRAWINGS

FIG. 6 is a diagram showing the content of logical storage area configuration information.

FIG. 7 is a diagram showing the content of logical storage unit configuration information.

FIG. 8 is a diagram showing the content of backup configuration information.

FIG. 9 is a diagram showing the content of virtual storage resource pool configuration information.

FIG. 10 is a diagram showing the content of virtual storage resource allocation map information.

FIG. 11 is a diagram showing the content of de-duplication status information.

FIG. 12 is a diagram showing the content of reduction effect management information.

FIG. 13 is a diagram showing the content of pool utilization information.

FIG. 14 is a diagram showing the content of host computer storage volume configuration information.

FIG. 15 is a diagram showing the content of threshold management information.

FIG. 20 is a flowchart for describing processing of switching de-duplication processing to ON.

FIG. 27 is a diagram showing the content of backup management information according to the fifth embodiment.

EXPLANATION OF REFERENCE

Figure 1:
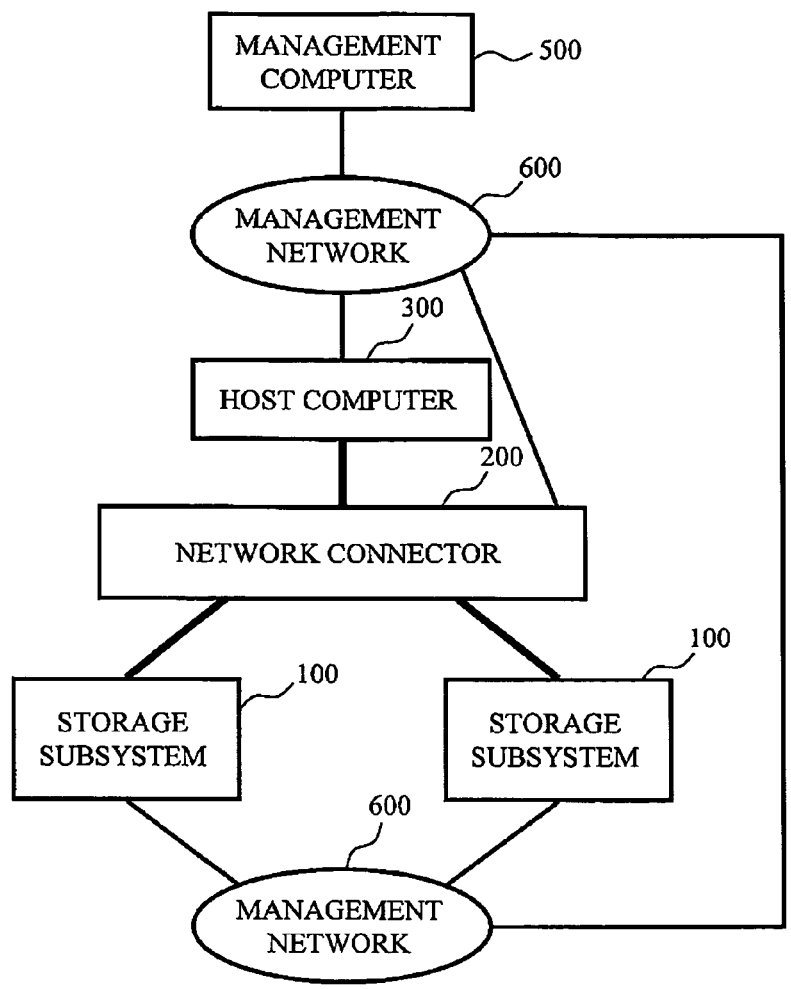
FIG. 1 is a diagram showing a schematic configuration of a storage network (storage system) according to the present invention (this applies to first to fourth embodiments).

10 . . . logical storage unit, 11 . . . logical storage area, 13 . . . virtual storage area pool, 15 . . . virtual storage area, 16 . . . storage volume, 100 . . . storage subsystem, 120 . . . magnetic storage device, 140 . . . data input/output communication interface, 150 . . . management communication interface, 160 . . . data input/output cache memory, 190 . . . storage controller, 200 . . . network connector, 300 . . . host computer, 320 . . . magnetic storage device, 340 . . . data input/output communication interface, 350 . . . management communication interface, 360 . . . data input/output cache memory, 370 . . . input interface, 375 . . . output interface, 380 . . . processing unit, 390 . . . bus, 400 . . . de-dupe appliance, 420 . . . magnetic storage device, 440 . . . data input/output communication interface, 450 . . . management communication interface, 460 . . . data input/output cache memory, 470 . . . input interface, 475 . . . output interface, 480 . . . processing unit, 500 . . . management computer, 520 . . . magnetic storage device, 550 . . . management communication interface, 560 . . . data input/output cache memory, 570 . . . input interface, 575 . . . output interface, 580 . . . processing unit, 590 . . . bus, 600 . . . management network, 1000 . . . program memory, 1001 . . . logical storage area configuration information, 1002 . . . logical storage unit configuration information, 1003 . . . backup configuration information, 1004 . . . virtual storage resource pool configuration information, 1005 . . . virtual storage resource allocation map information, 1006 . . . de-duplication status information, 1007 . . . reduction effect management information, 1008 . . . pool utilization information, 1009 . . . storage area configuration management program, 1010 . . . virtual storage resource management program, 1011 . . . de-duplication program, 1012 . . . data writing program 1013 . . . backup data recording program, 1014 . . . backup configuration management program, 3000 . . . program memory, 3001 . . . host computer storage volume configuration information, 3002 . . . data write request program, 4001 . . . backup management information, 5000 . . . program memory, 5001 . . . threshold management information, 5002 . . . configuration information update program, 5003 . . . pool utilization information request program, 5004 . . . backup request program, 5005 . . . threshold management program, 5006 . . .

de-duplication control program, 10011 . . . logical storage area identification information, 10012 . . . RAID group identification information, 10013 . . . starting block address, 10014 . . . ending block address, 10021 . . . communication interface identification information, 10022 . . . logical storage unit identification information, 10023 . . . logical storage area identification information, 10031 . . . copy-source logical storage area identification information, 10032 . . . copy-destination information, 10033 . . . virtual storage area identification information, 10034 . . . virtual storage area pool identification information, 10041 . . . virtual storage area pool identification information, 10042 . . . logical storage area identification information, 10051 . . . virtual storage area information, 10052 . . . logical storage area information, 10053 . . . virtual storage area identification information, 10054 . . . block address, 10055 . . . logical storage area identification information, 10056 . . . block address, 10061 . . . virtual storage area identification information, 10062 . . . de-duplication status, 10071 . . . virtual storage area identification information, 10072 . . . reduction effect, 10081 . . . virtual storage area pool identification information, 10082 . . . pool utilization, 30011 . . . storage volume identification information, 30012 . . . storage device identification information, 30013 . . . communication interface identification information, 30014 . . . logical storage unit identification information, 40011 . . . copy-source information, 40012 . . . copy-destination information, 40013 . . . logical storage area identification information, 40014 . . . block address, 40015 . . . virtual storage area identification information, 40016 . . . block address, 50011 . . . virtual storage area identification information, 50012 . . . threshold, 50013 . . . reduction effect

BEST MODE FOR CARRYING OUT THE INVENTION

The present invention relates to configuration management of a storage system for relieving degradation in performance by setting a criterion for determining whether or not to apply de-duplication processing.

Embodiments of the present invention will be described below with reference to the accompanying drawings. However, it is to be noted that the embodiments are only examples for implementing the present invention and do not limit the technical scope of the present invention. Throughout the drawings, like elements are given like reference numerals.

1) First Embodiment

<Connection Configuration of Storage System>

FIG. 1 is a diagram showing a physical connection relationship among apparatuses in a storage system according to a first embodiment of the present invention.

The storage system (storage area network) includes: a host computer 300 that runs applications such as databases and file servers and performs data input/output to and from storage areas; and storage subsystems 100 that include hard disks and provide storage areas as units of areas for storing data, wherein these apparatuses are interconnected via a network connector 200 to be capable of data input/output to and from each other. The storage subsystems 100, the network connector 200, and the host computer 300 are connected to the management computer 500 via a management network 600.

In this embodiment, the management network 600 and a data input/output network formed by the network connector 200 are independent from each other. However, a single network may serve purposes of the both networks.

<Exemplary Logical Configuration of Storage System>

Figure 2:
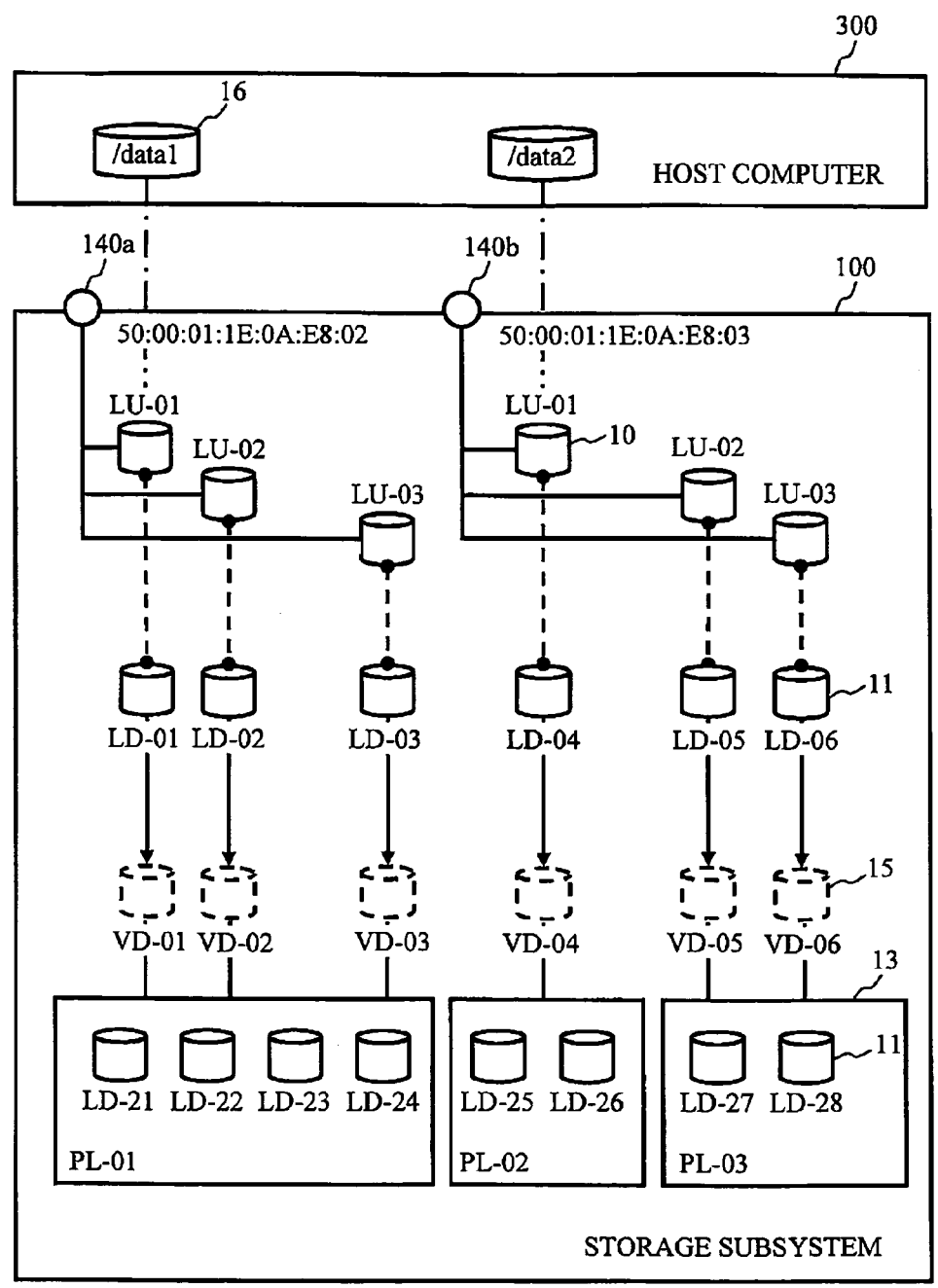
FIG. 2 is a diagram showing an exemplary storage configuration (correspondence).

FIG. 2 is a diagram showing an exemplary logical representation of the storage system. In FIG. 2, logical storage areas 11 are associated with storage units 10 (see FIG. 7). Here, a storage unit "LU-01" for a data input/output communication interface "50:00:01:1E:0A:E8:02" corresponds to a logical storage area "LD-01." The storage units 10 are further associated with host computer storage volumes 16 on the host computer 300 (see FIG. 14). Here, the storage unit "LU-01" for the data input/output communication interface "50:00:01:1E:0A:E8:02" corresponds to a host computer storage volume "/data1" (see FIG. 14).

Defined for the logical storage areas 11 are copy-source logical storage areas for which LU paths are typically defined, and copy-destination storage areas to which data in the data copy-source logical storage areas is written when the data is backed up. For example, "LD-01," "LD-02," "LD-03," "LD-04," "LD-05," and "LD-06" are defined as the copy-source logical storage areas, and "VD-01," "VD-02," "VD-03," "VD-04," "VD-05," and "VD-06" are defined as the corresponding copy-destination virtual storage areas (see FIG. 8).

Further, the virtual storage areas 15 are associated with virtual storage area pools 13, which consist of the logical storage areas 11. For example, the virtual storage areas "VD-01," "VD-02," and "VD-03" are associated with a virtual storage area pool "PL-01," which consists of logical storage areas "LD-21," "LD-22," "LD-23," and "LD-24" (see FIGS. 8 and 9).

<Configuration of Storage Subsystem>

Figure 3:
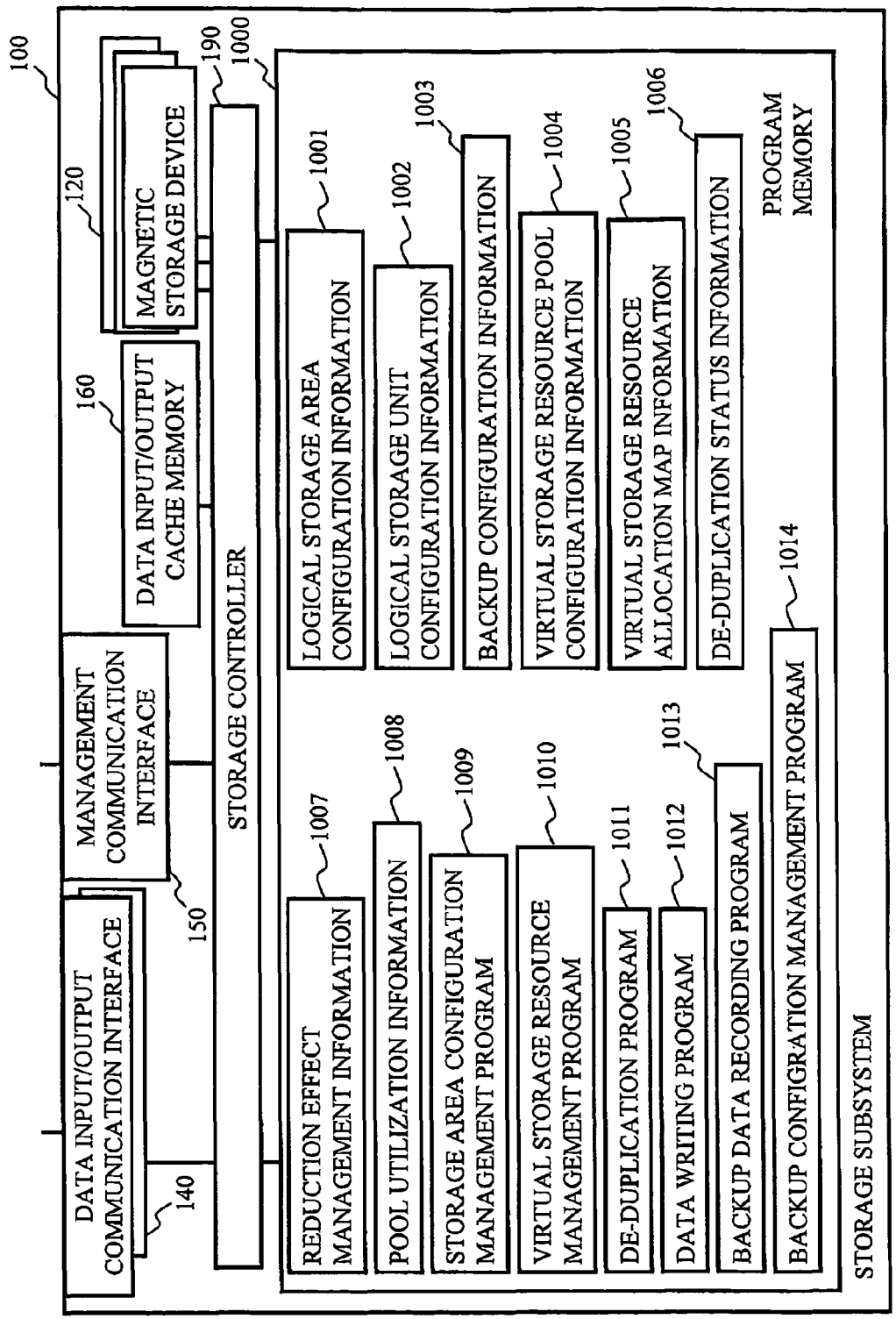
FIG. 3 is a diagram showing an internal configuration of a storage subsystem.

FIG. 3 is a diagram showing an exemplary configuration of the storage subsystem 100. The storage subsystem 100 includes: data input/output communication interfaces 140 connecting to the network connector 200 for performing data input/output; a management communication interface 150 connecting to the management network for performing input/output of management information; a storage controller 190 including a processor responsible for control within the storage subsystem; a program memory 1000 serving as a storage space for storing programs necessary for operation of the storage subsystem 100; a data input/output cache memory 160 serving as a temporary storage area for accelerating input/output from the host computer 300 to the storage areas; and magnetic storage devices 120, wherein these components are interconnected via the storage controller 190.

The data input/output communication interfaces 140 and the management communication interface 150 may be implemented by, for example, network input/output devices based on conventional communication technologies such as fibre channel and Ethernet™. In the present invention, it is not required to put restrictions on the number of data input/output communication interfaces 140 and the number of management communication interfaces 150. Also, the data input/output communication interfaces 140 and the management communication interface 150 may not be independent from each other. Rather, the data input/output communication interfaces 140 may be shared for input/output of management information.

The data input/output cache memory 160 is typically implemented by volatile memory but may be substituted with nonvolatile memory or a magnetic storage device. In the present invention, it is not required to put restrictions on the number of units of and the capacity of the data input/output cache memory 160.

The program memory 1000 is a memory space implemented by a magnetic storage device or volatile semiconductor memory and is used for holding basic programs and information that are necessary for operation of the storage subsystem 100. The program memory 1000 holds control programs and control information for the storage subsystem 100. Each program cooperates with the storage controller 190 to operate as each processing unit. For example, a de-duplication program 1011 cooperates with the storage controller 190 to operate as a de-duplication processing unit.

The control programs and control information held in the program memory 1000 are as follows.

logical storage area configuration information 1001
    logical storage unit configuration information 1002
    backup configuration information 1003
    virtual storage resource pool configuration information 1004
        virtual storage resource allocation map information 1005
        de-duplication status information 1006
        reduction effect management information 1007
        pool utilization information 1008
        storage area configuration management program 1009
        virtual storage resource management program 1010
        de-duplication program 1011
        data writing program 1012
        backup data recording program 1013
        backup configuration management program 1014

The storage area configuration management program 1009 manages properties of the logical storage units 10 and the logical storage areas 11. The storage area configuration management program 1009 defines LU paths under instructions from the host and controls association of the logical storage areas 11 with the storage units 10.

The virtual storage resource management program 1010 is a program that manages allocation of the logical storage areas 11 in the backup virtual storage area pools 13. The virtual storage resource management program 1010 also controls association between the logical storage units 10 and the backup virtual storage area pools 13.

The virtual storage resource management program 1010 controls address association between the copy-source logical storage areas 11 associated with the logical storage units 10 and the copy-destination logical storage areas 11 associated with the backup virtual storage area pools 13. The virtual storage resource management program 1010 also obtains the utilization of the virtual storage area pools.

The de-duplication program 1011 is a program that, at the request of the management computer 500 for switching between ON and OFF, determines whether the de-duplication is set to ON or OFF for a volume of interest and switches the de-duplication to ON or OFF as needed. The de-duplication program 1011 also, when the de-duplication is set to ON, determines whether the same data as data in a logical storage area 11 recorded in the virtual storage resource allocation map information 1005 is not stored, and performs de-duplication writing.

The data writing program 1012 is a program that selects a logical storage area 11 and writes data thereto.

The backup data recording program 1013 is a program that reads data in a backup copy-source logical storage area 11 and copies the backup data into a backup copy-destination logical storage area 11.

The backup configuration management program 1014 is a program that associates the copy-source storage areas with the copy-destination storage areas.

The logical storage area configuration information 1001 to the pool utilization information 1008 will be described later.

<Configuration of Host Computer>

Figure 4:
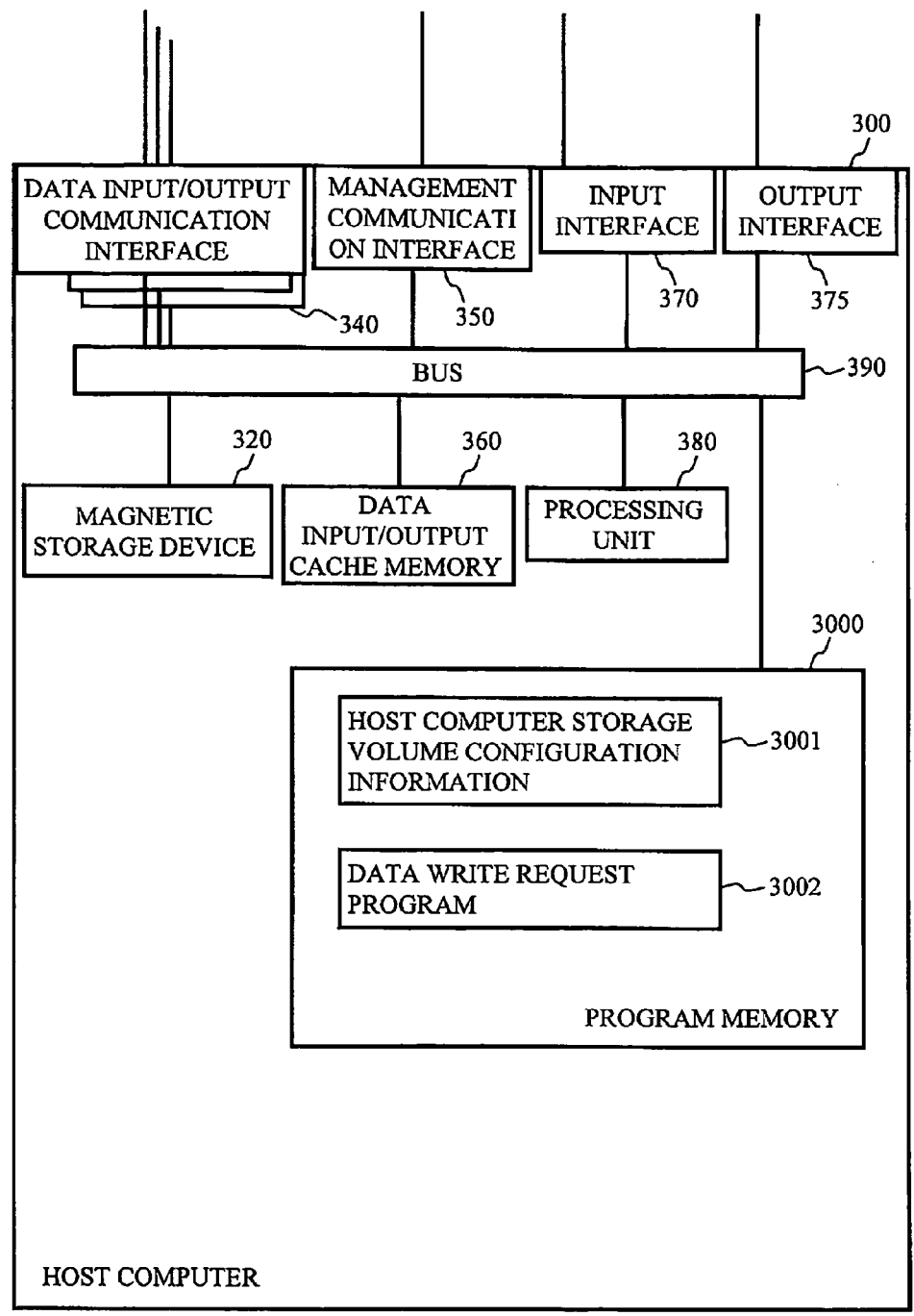
FIG. 4 is a diagram showing an internal configuration of a host computer.

FIG. 4 is a diagram showing an exemplary configuration of the host computer 300. The host computer 300 includes: data input/output communication interfaces 340 connected to the network connector 200 for performing data input/output; a management communication interface 350 connected to the management network 600 for performing input/output of management information; an input interface 370, such as a keyboard or mouse, for an operator to input information; an output interface 375, such as a general-purpose display, for outputting information for the operator; a processing unit 380 corresponding to a CPU that performs various calculations; a magnetic storage device 320 for storing basic software such as an operating system and applications; a program memory 3000 serving as a storage space for storing programs necessary for operation of the host computer 300; and a data input/output cache memory 360 implemented by volatile memory or the like for accelerating data input/output, wherein these components are interconnected via a communication bus 390. Thus, the hardware configuration of the host computer 300 shown in this example can be implemented in a general-purpose computer (PC).

The data input/output communication interfaces 340 and the management communication interface 350 may be implemented by network input/output devices based on conventional communication technologies such as fibre channel and Ethernet™. In the present invention, it is not required to put restrictions on the number of data input/output communication interfaces 340 and the number of management communication interfaces 350. Also, the data input/output communication interfaces 340 and the management communication interface 350 may not be independent from each other. Rather, the data input/output communication interfaces 340 may be shared for input/output of management information.

The data input/output cache memory 360 is typically implemented by volatile memory but may be substituted with nonvolatile memory or a magnetic storage device. In the present invention, it is not required to put restrictions on the number of units of and the capacity of the data input/output cache memory 360.

The program memory 3000 is a memory space implemented by a magnetic storage device or volatile semiconductor memory and is used for holding basic programs and information that are necessary for operation of the host computer 300. Each program cooperates with the processing unit 380 to operate as each processing unit/section. For example, a data write request program 3002 cooperates with the processing unit 380 to operate as a data write request processing unit/section. A control program and control information held in the program memory 3000 are as follows.

host computer storage volume configuration information 3001
    data write request program 3002

The data write request program 3002 is a program that determines a host computer volume 16 for which writing is to be performed, and transmits a write request message to a communication interface 140 and a logical storage unit 10 in the storage subsystem 100 associated with that storage volume.

The control information will be described later.

<Configuration of Management Computer>

Figure 5:
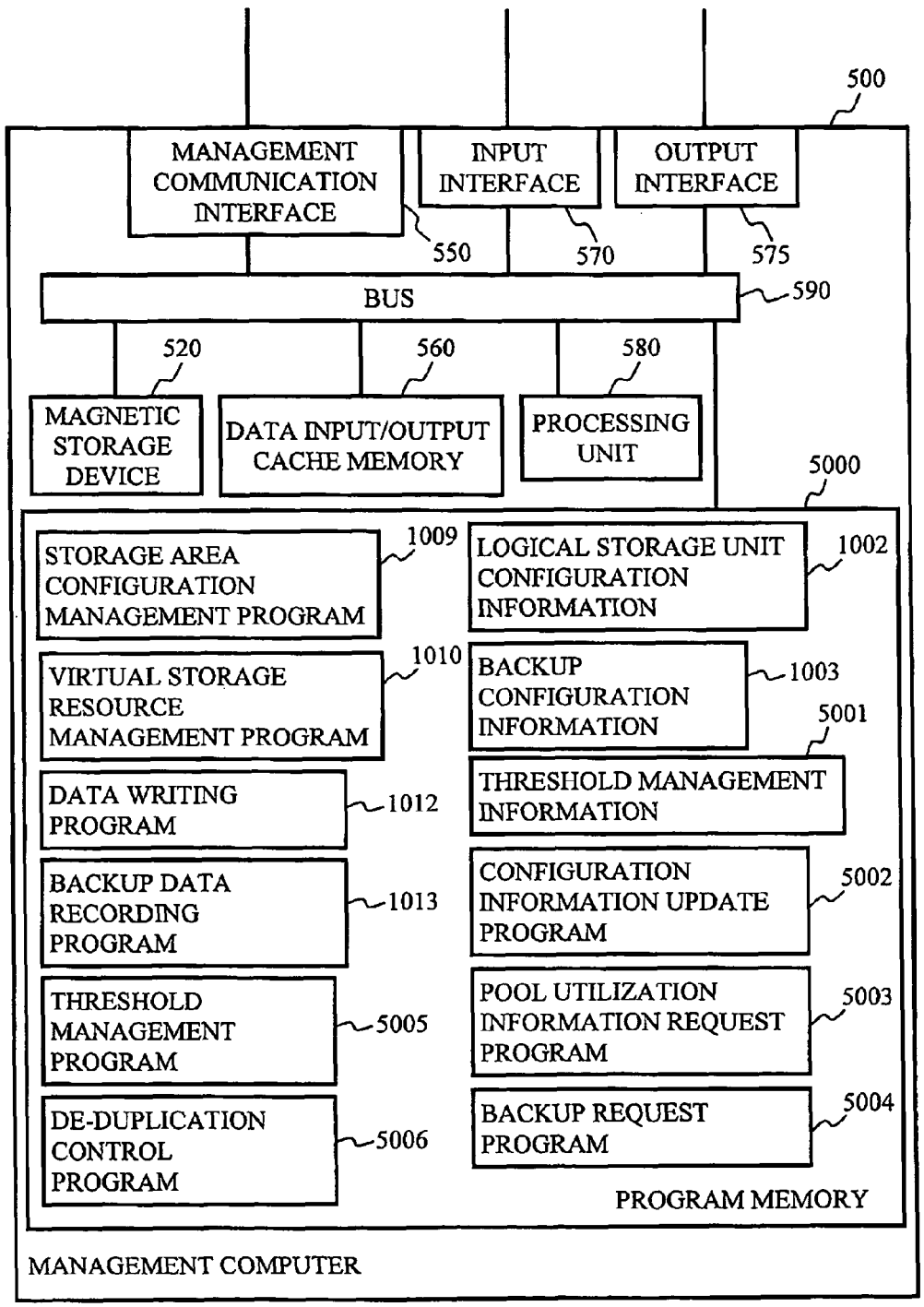
FIG. 5 is a diagram showing an internal configuration of a management computer.

FIG. 5 shows an exemplary configuration of the management computer 500. The management computer 500 includes: a management communication interface 550 connecting to the management network 600 for performing input/output of management information; an input interface 570, e.g., a keyboard or mouse, for an operator to input information; an output interface 575, e.g., a general-purpose display, for outputting information for the operator; a processing unit 580 corresponding to a CPU that performs various calculations; a magnetic storage device 520 for storing basic software such as an operating system and applications; and a program memory 5000 serving as a storage space for storing programs necessary for operation of the management computer 500, wherein these components are interconnected via a communication bus 590. Thus, the hardware configuration of the management computer 500 shown in this example can be implemented in a general-purpose computer (PC).

The program memory 5000 is a memory space implemented by a magnetic storage device or volatile semiconductor memory and is used for holding basic programs and information that are necessary for operation of the management computer 500. Each program cooperates with the processing unit 580 to operate as each processing unit/section. For example, a pool utilization information request program 5003 cooperates with the processing unit 580 to operate as a pool utilization request processing unit/section. Control programs and control information held in the program memory 5000 are listed below.

logical storage unit configuration information 1002
    backup configuration information 1003
    threshold management information 5001
    configuration information update program 5002
    pool utilization information request program 5003
    backup request program 5004
    storage area configuration management program 1009
    virtual storage resource management program 1010
    data writing program 1012
    backup data recording program 1013
    data write request program 3002
    threshold management program 5005
    de-duplication control program 5006

The configuration information update program 5002 is a program that updates the logical storage unit configuration information 1002 of the management computer 500 to reflect the logical storage unit configuration information 1002 received from the storage subsystem 100.

The pool utilization information request program 5003 is a program that requests the storage subsystem 100 to transmit the pool utilization.

The backup request program 5004 is a program that transmits a data backup request to the storage subsystem 100.

The threshold management program 5005 is a program that manages a threshold for the reduction effect of applying the de-duplication in the copy-destination virtual storage areas 15. Exemplary ways of setting the threshold include inputting by a user from the input interface 570, and calculating by the threshold management program 5005. The threshold management program 5005 also performs processing of obtaining information about the reduction effect of the copy-destination virtual storage areas 15 calculated by the de-duplication program 1011 included in the storage subsystem 100.

The de-duplication control program 5006 is a program that requests the storage subsystem 100 that, for a virtual storage area 15 whose reduction effect is at or above the threshold, data should be written from a copy-source logical storage area 11 in de-duplication mode by the de-duplication program 1011, whereas for a virtual storage area 15 whose reduction effect is below the threshold, data should be written from a copy-source logical storage area 11 by the backup data recording program 1013.

The control information will be described later.

<Configuration of Control Information>

Configuration of the control information (such as various kinds of configuration information) in the storage subsystem 100, the host computer 300, and the management computer 500 will be described below.

FIG. 6 is a diagram showing an exemplary configuration of the logical storage area configuration information 1001 included in the storage subsystem 100. Logical storage areas 11 recorded in logical storage area identification information 10011 represent information for identifying logical storage areas defined for RAID groups recorded in RAID group identification information 10012. Physical locations of these logical storage areas 11 match physical address spaces on the RAID groups recorded in starting block address 10013 and ending block address 10014. That is, FIG. 6 shows in which RAID group each copy-source logical area is included, and which addresses each copy-source logical area uses.

FIG. 7 is a diagram showing an exemplary configuration of the logical storage unit configuration information 1002 included in the storage subsystem 100. According to FIG. 7, storage areas 11 recorded in logical storage area identification information 10023 are associated with storage units 10 recorded in logical storage unit identification information 10022 defined for data input/output communication interfaces 140 recorded in communication interface identification information 10021. The storage units 10 are units of storage resources accessible from the host computer 300 connected to the storage subsystem 100 and correspond to the volumes mounted on a file system that is run by the host computer 300.

FIG. 8 is a diagram showing an exemplary configuration of the backup configuration information 1003 included in the storage subsystem 100. According to FIG. 8, data of logical storage areas 11 recorded in copy-source logical storage area identification information 10031 is associated with virtual storage areas 15 recorded in virtual storage area identification information 10033 in copy-destination information 10032. Also according to FIG. 8, the virtual storage areas 15 recorded in the virtual storage area identification information 10033 are associated with virtual storage area pools 13 recorded in virtual storage area pool identification information 10034.

FIG. 9 is a diagram of an exemplary configuration of the virtual storage resource pool configuration information 1004 included in the storage subsystem 100, and it shows the correspondence between PLs (pools) and LDs (logical storage areas). It can be seen from FIG. 9 that each virtual storage area pool 13 recorded in virtual storage area pool identification information 10041 is a set of storage areas that consist of storage areas 11 recorded in logical storage area identification information 10042.

FIG. 10 is a diagram showing an exemplary configuration of the virtual storage resource allocation map information 1005 included in the storage subsystem 100. The correspondence between logical addresses and virtual addresses can be recognized from this information. The correspondence information in FIG. 10 can be used for checking whether or not the same data as copy-source data exists in a copy-destination. For example, when data is to be written to VD-01, it is checked whether the same data as that data exists in the portion corresponding to the addresses 0x0001 to 0x0030 of LD-21 and LD-22.

In FIG. 10, virtual storage area information 10051 and logical storage area information 10052 associate virtual areas and physical areas with each other. Block addresses 10054 of virtual logical storage areas 15 recorded in virtual storage area identification information 10053 are mapped to block addresses 10056 of logical storage areas 11 recorded in logical storage area identification information 10055.

FIG. 11 is a diagram showing an exemplary configuration of the de-duplication status information 1006 included in the storage subsystem 100. If the de-duplication is applied in a virtual storage area 15 recorded in virtual storage area identification information 10061 (duplicate storage processing is not performed), "ON" is indicated in de-duplication status 10062. If the de-duplication is not applied (duplicate storage processing is performed), "OFF" is indicated in the de-duplication status 10062.

FIG. 12 is a diagram showing an exemplary configuration of the reduction effect management information 1007 included in the storage subsystem 100. This table manages the reduction effect 10072 of virtual storage areas 15 recorded in virtual storage area identification information 10071. The reduction effect is calculated with an equation below for each virtual storage area 15 recorded in the virtual storage area identification information 10053 in the virtual storage resource allocation map information 1005.

> Reduction effect=(1−(the number of de-duplicated block addresses 10056 in logical storage areas/ the number of entries of block addresses 10054 of the virtual storage area)×100

Figure 13:
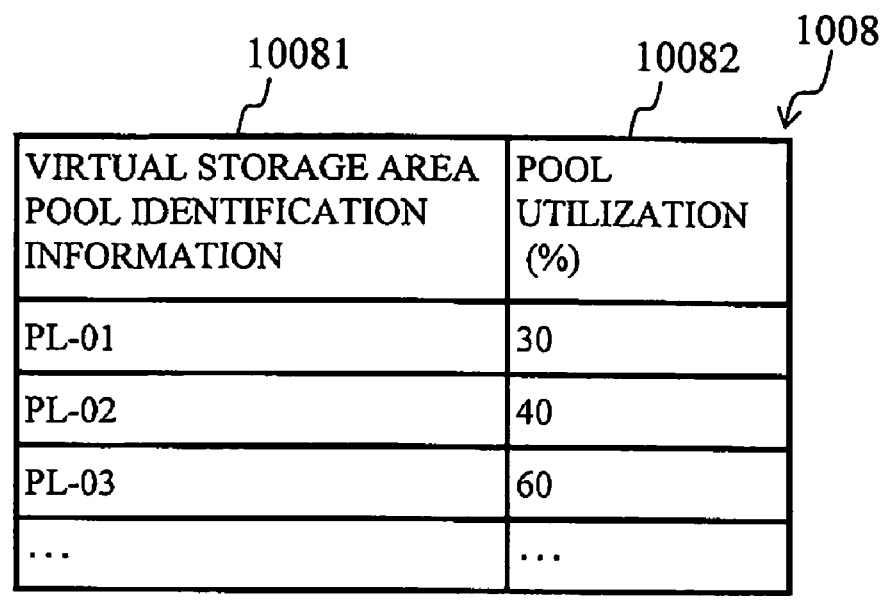

FIG. 13 is the pool utilization information 1008 included in the storage subsystem 100. The utilization of virtual storage area pools 10081 is recorded in pool utilization 10082.

FIG. 14 is a diagram showing an exemplary configuration of the host computer storage volume configuration information 3001 included in the host computer 300. The file system that is run by the host computer 300 mounts storage devices recorded in storage device identification information 30012 on storage volumes 16 recorded in storage volume identification information 30011. These storage devices correspond to storage units that are set for data input/output communication interfaces 140 recorded in communication interface identification information 30013 and that are recorded in logical storage unit identification information 30014. That is, a request for input/output to or from a storage volume recorded in the storage volume identification information 30011 is made to a storage unit 10 set for a data input/output communication interface 140 on the storage subsystem 100 accessible via the data input/output network.

FIG. 15 is a diagram showing an exemplary configuration of the threshold management information 5001 included in the management computer 500. While the reduction effect in each virtual storage area 15 recorded in virtual storage area identification information 50011 is recorded in 50013, a threshold for the reduction effect of switching the de-duplication to ON is recorded in 50012. If the reduction effect threshold is set as a fixed value, it is set based on empirical values: to put priority on the performance, a high threshold is set to avoid the de-duplication as much as possible, whereas to put priority on the capacity efficiency, a low threshold is set to promote the de-duplication.

<Processing of Writing Data to Logical Storage Area>

Figure 16:
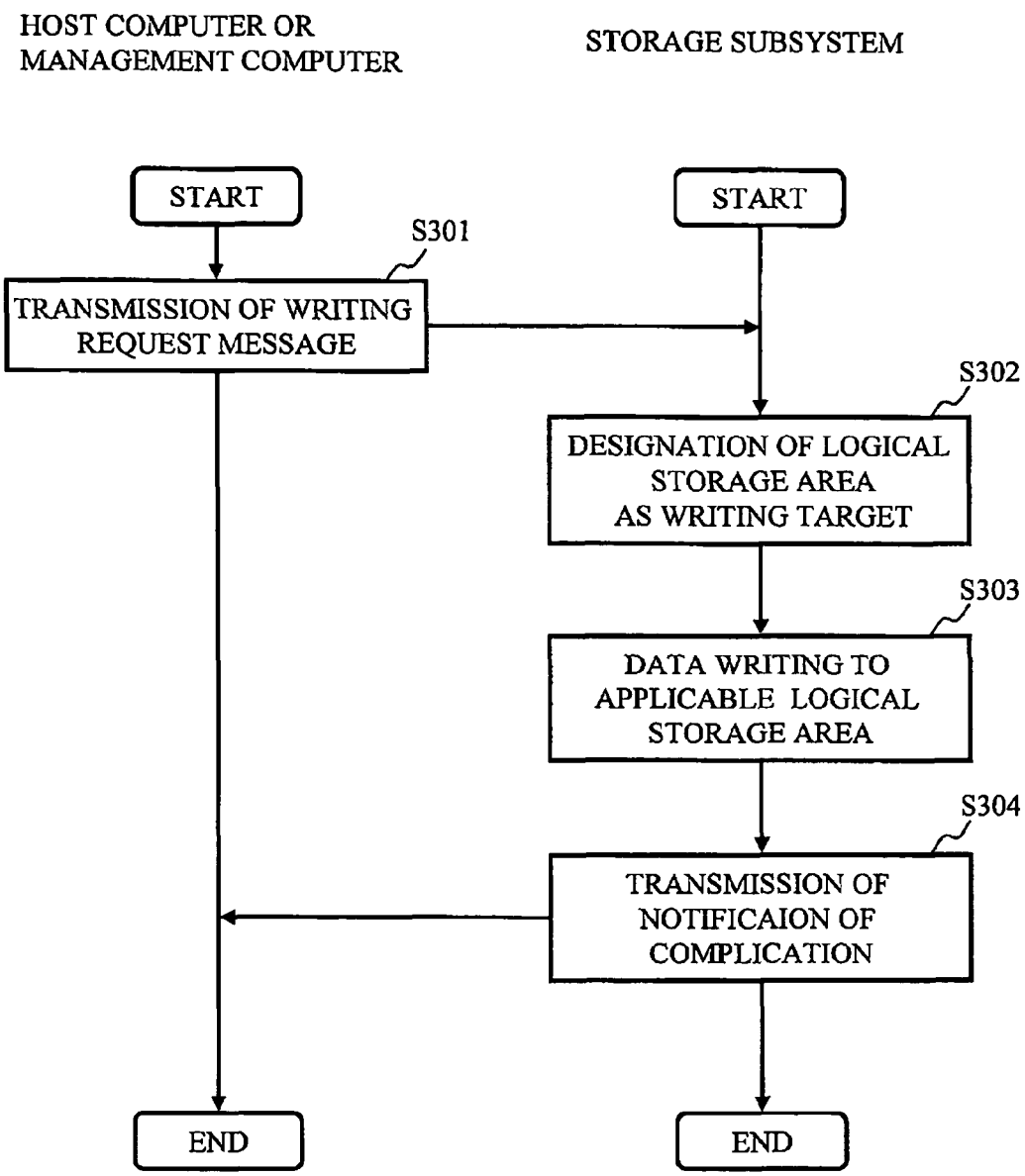
FIG. 16 is a flowchart for describing writing processing.

FIG. 16 is a flowchart for describing processing of writing data to a logical storage area 11 in the storage subsystem 100. The processing of writing data to a logical storage area 11 is performed by the data writing program 1012 included in the storage subsystem 100 at the request of the management computer 500 or the host computer 300.

First, from the storage volume identification information 30011 in the host computer storage area configuration information 3001, the data write request program 3002 included in the host computer 300 determines a host computer storage volume 16 for which writing is to be performed. It then transmits a data write request message in which a communication interface 140 and a storage unit 10 indicated for that record are designated as a writing target (step S301).

The storage subsystem 100 receives the data write request message, and the storage area configuration management program 1009 searches the logical storage unit configuration information 1002 to designate a write-target logical storage area 11 (step S302). The data writing program 1012 writes data to this logical storage area 11 (step S303).

Finally, the storage subsystem 100 transmits a notification of normal completion to the management computer 500 or the host computer 300 (step S304).

<Data Copy Processing>

Figure 17:
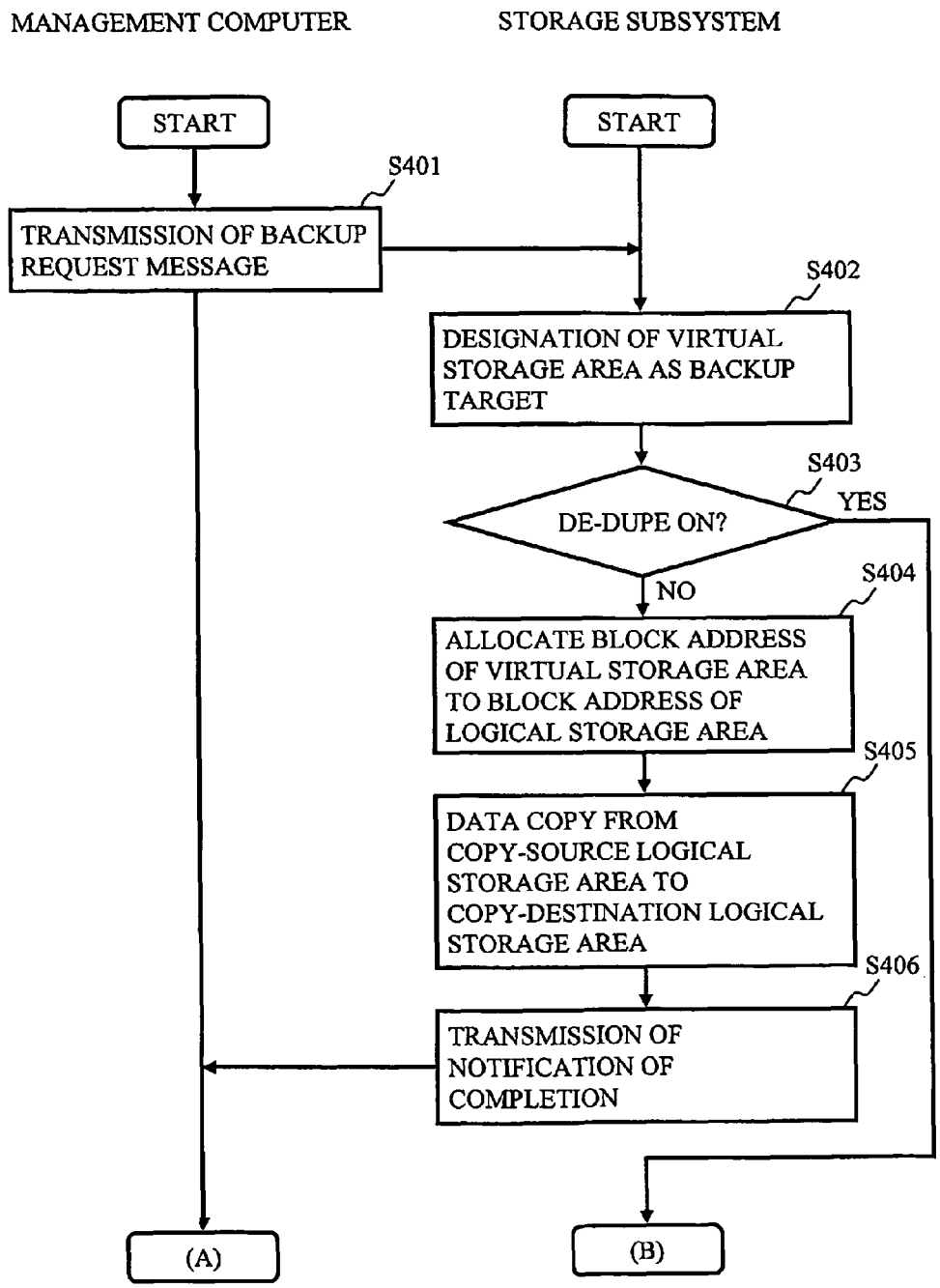
FIG. 17 is a flowchart (1) for describing backup data recording processing.
Figure 18:
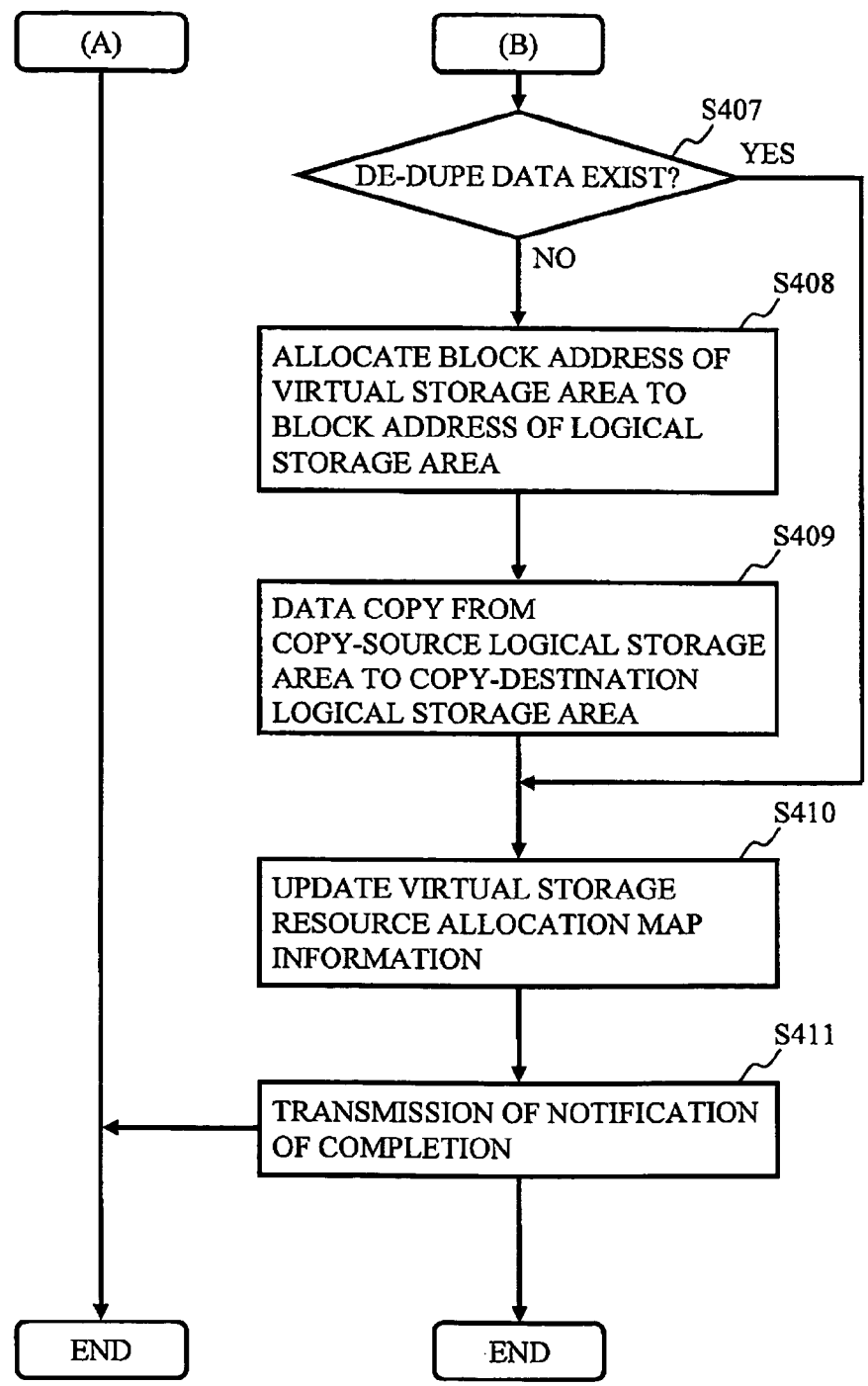
FIG. 18 is a flowchart (2) for describing the backup data recording processing.

FIGS. 17 and 18 are a flowchart for describing processing (data copy processing) for backup from a copy-source logical storage area 11 to a copy-destination virtual storage area 15 in the storage subsystem 100.

The backup request program 5004 included in the management computer 500 refers to the backup configuration information 1003 (FIG. 8) to designate the logical storage area 11 in the copy-source logical storage area identification information 10031 to be backed up. It then transmits a backup request to the storage subsystem 100 (step S401).

The storage subsystem 100 receives the backup request, and the backup configuration management program 1014 searches the backup configuration information 1003 to designate a corresponding copy-destination virtual storage area 15 recorded in the copy-destination virtual storage area identification information 10033 (step S402). The backup configuration management program 1014 also refers to the de-duplication status 10062 (FIG. 11) of the copy-destination virtual storage area 15 recorded in the virtual storage area identification information 10061 in the de-duplication status information 1006 to determine whether the de-duplication is applied (step S403). If "ON" is recorded in the de-duplication status 10062 (YES in step S403), the processing transfers to step S407.

If "OFF" is recorded in the de-duplication status 10062 (NO in step S403), the virtual storage resource management program 1010 refers to the virtual storage resource allocation map information 1005. It allocates the address 10054 of the virtual storage area 15 to a block address 10056 of an unallocated logical storage area 11, i.e., to a block address 10056 of a logical storage area 11 for which the corresponding virtual storage area identification information 10053 and block address 10054 indicate "NULL" (step S404).

The backup data recording program 1013 then reads data in the copy-source logical storage area 11 and writes the data to the block address 10056 of the logical storage area 11 associated with the copy-destination virtual storage area 15 (step S405). The backup data recording program 1013 transmits a notification of normal completion to the management computer 500 (step S406).

If "ON" is indicated in the de-duplication status 10062 (YES in step S403), the de-duplication program 1011 reads out data in the copy-source logical storage area 11. The de-duplication program 1011 refers to the virtual storage area identification information 10053 and the logical storage area identification information 10055 in the virtual storage resource allocation map information 1005 to determine whether the same data as the read-out data is written in any of block addresses 10056 of all logical storage areas 11 corresponding to the backup virtual storage area 15 (step S407). In searching for the same data for the backup virtual storage area, the de-duplication program 1011 calculates the reduction effect and updates the reduction effect 10072 of this virtual storage area 15 recorded in the virtual storage area identification information 10071 in the reduction effect management information 1007. The reduction effect is calculated with an equation below for each virtual storage area 15 recorded in the virtual storage area identification information 10053 in the virtual storage resource allocation map information 1005.

Reduction effect=(1−(the number of de-duplicated block addresses 10056 in logical storage areas/ the number of entries of block addresses 10054 of the virtual storage area)×100

If the same data as the read-out data is already written in any logical storage area 11 recorded in the logical storage area identification information 10055 (YES in step S407), the processing transfers to step S410.

If the same data as the read-out data is not yet written in any logical storage area 11 recorded in the logical storage area identification information 10055 (NO in step S407), the virtual storage resource management program 1010 refers to the virtual storage resource allocation map information 1005. It allocates the block address of the virtual storage area 15 to a block address 10056 of an unallocated logical storage area 11, i.e., to a block address of a logical storage area 11 for which the corresponding virtual storage area identification information 10053 and block address 10054 indicate "NULL" (step S408).

The de-duplication program 1011 writes the data read from the copy-source logical storage area 11 to the allocated copy-destination logical storage area 11 (step S409).

The virtual storage resource management program 1010 then updates the virtual storage resource allocation map information 1005 (step S410). In the case where the same data as the read-out data is already written in a logical storage area 11 recorded in the logical storage area identification information 10055 (YES in step S407), the de-duplication program 1011 does not write the backup data but updates the virtual storage resource allocation map information 1005 so that the block address 10054 of the virtual storage area 15 referred to by the copy data is associated with the block address 10056 of the logical storage area 11 in which the same data is already written (step S410).

Finally, the de-duplication program 1011 transmits a notification of normal completion to the management computer 500 (step S411).

<Obtaining Reduction Effect>

Figure 19:
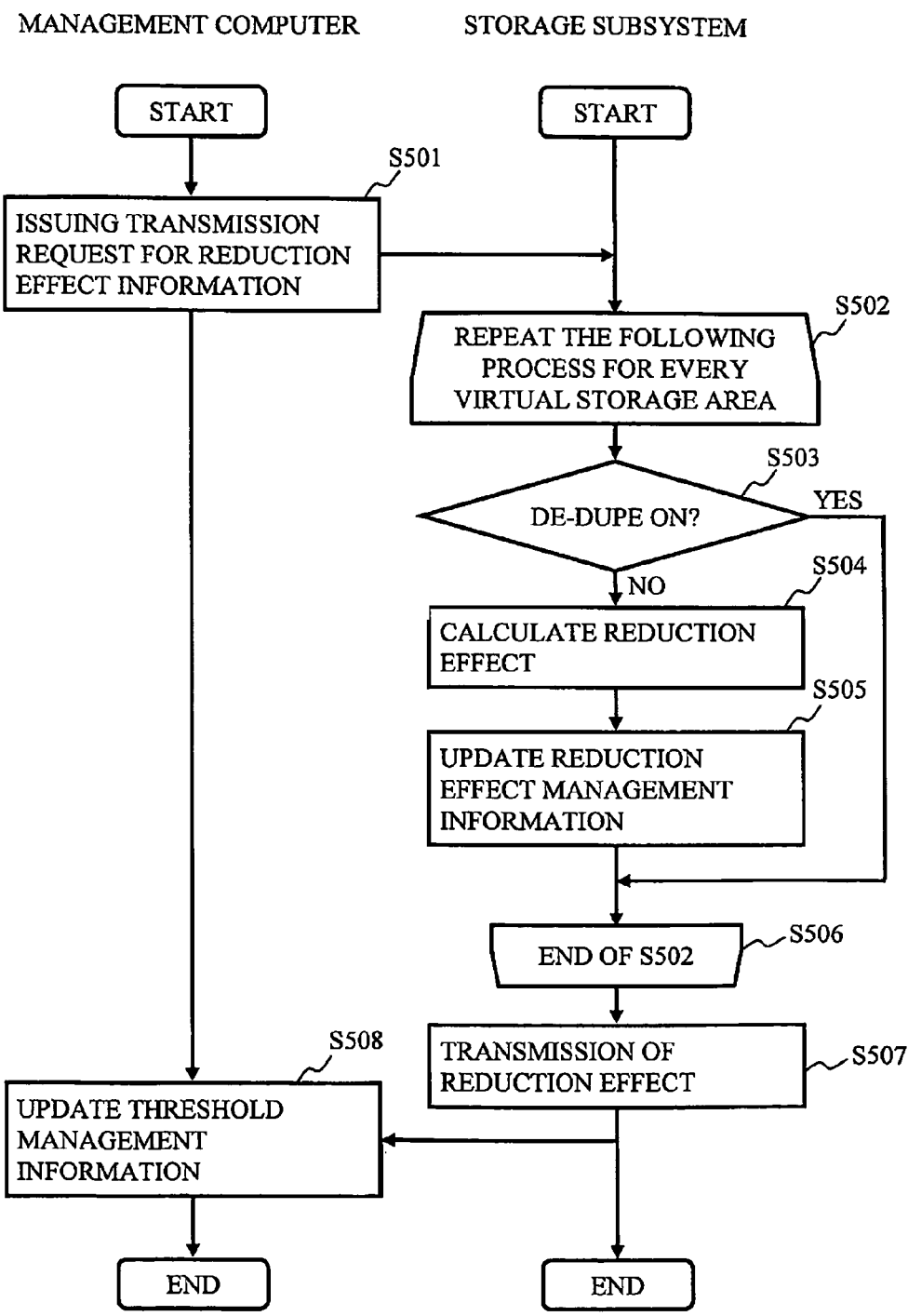
FIG. 19 is a flowchart for describing processing of updating the reduction effect management information.

FIG. 19 is a flowchart for describing processing of obtaining reduction effect information in the management computer 500. This processing is performed periodically, for example at a fixed time every day.

First, the threshold management program 5005 included in the management computer 500 transmits a reduction effect transmission request message to the storage subsystem 100 (step S501).

The storage subsystem 100 receives the reduction effect transmission request message, and the de-duplication program 1011 included therein repeats the following processing for every virtual storage area 15 recorded in the virtual storage area identification information 10071 in the reduction effect management information 1007 (step S502). That is, the de-duplication program 1011 refers to the de-duplication status information 1006 to determine whether the de-duplication is applied from the de-duplication status 10062 of the virtual storage area 15 recorded in the copy-destination virtual storage area identification information 10061 (step S503). If "ON" is recorded in the de-duplication status 10062 (YES in step S503), the processing transfers to step S506.

If "OFF" is recorded in the de-duplication status 10062 (NO in step S503), the de-duplication program 1011 refers to the virtual storage resource allocation map information 1005 to calculate the reduction effect (step S504). The reduction effect is calculated with an equation below for each virtual storage area 15 recorded in the virtual storage area identification information 10053 in the virtual storage resource allocation map information 1005.

Reduction effect=(1−(the number of de-duplicated block addresses 10056 in logical storage areas/ the number of entries of block addresses 10054 of the virtual storage area)×100

The de-duplication program 1011 then updates the reduction effect 10072 of the virtual storage area 15 recorded in the virtual storage area identification information 10071 in the reduction effect management information 1007 (step S505).

The storage subsystem 100 transmits the reduction effect to the management computer 500 (step S507).

The management computer 500 receives the reduction effect from the storage subsystem 100, and the threshold management program 5005 included therein updates the threshold management information 5001 (step S508).

<Switching of De-Duplication Processing: OFF-to-ON Switching Processing>

Figure 20:
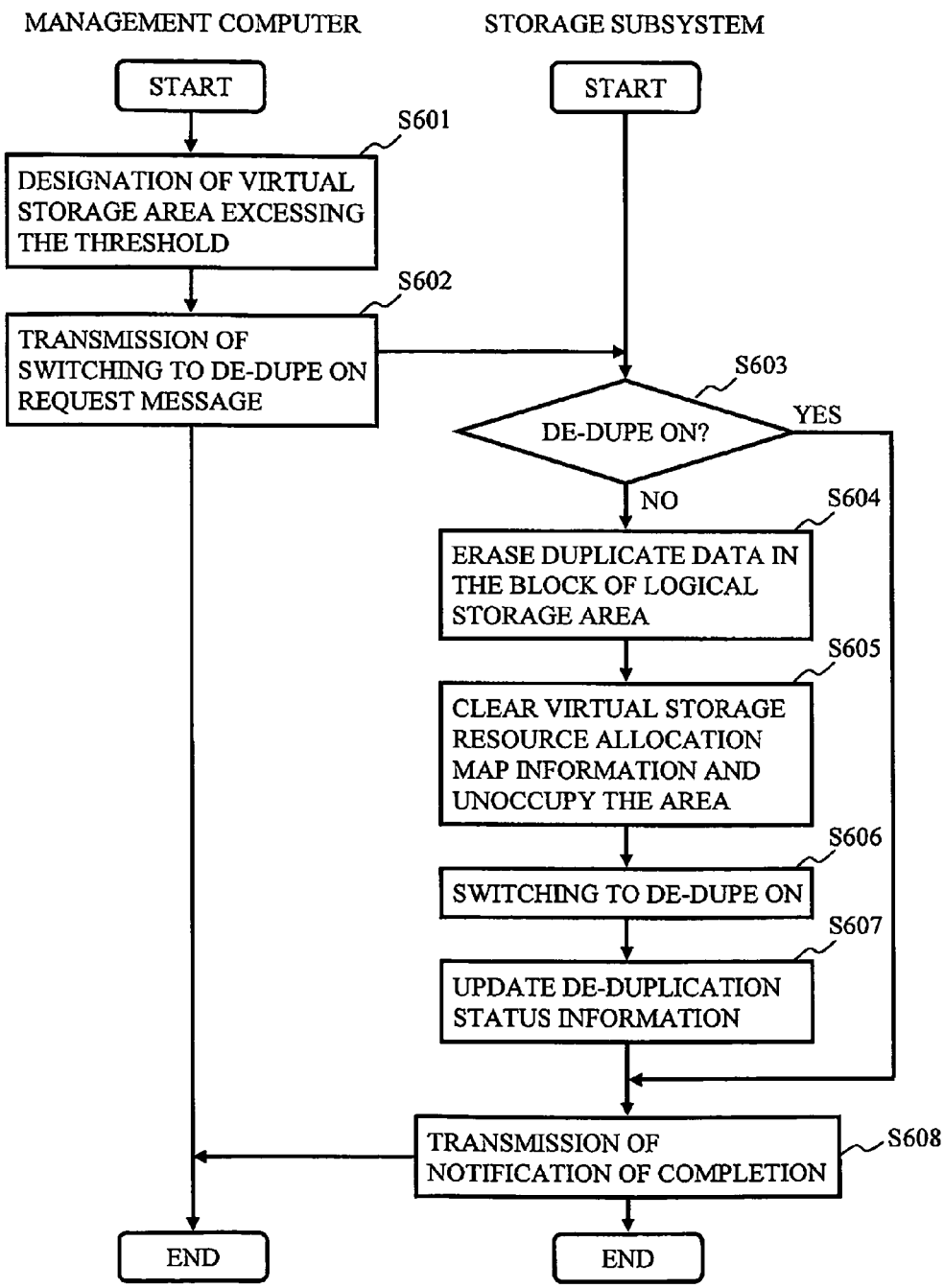

FIG. 20 is a flowchart for describing processing of switching the de-duplication processing from OFF to ON in the storage subsystem 100. This processing is performed after the processing in FIG. 19.

First, the de-duplication control program 5006 included in the management computer 500 searches the threshold management information 5001 to designate a virtual storage area 15 recorded in the virtual storage area identification information 50011 such that "THRESHOLD</=REDUCTION EFFECT" (step S601). The de-duplication control program 5006 transmits a de-duplication ON request message to the storage subsystem 100 (step S602).

The storage subsystem 100 receives the de-duplication ON request message, and the de-duplication program 1011 included therein determines whether the de-duplication processing is applied from the de-duplication status 10062 in the de-duplication status information 1006 (step S603). If "ON" is recorded in the de-duplication status 10062 (YES in step S603), the processing transfers to step S608.

If "OFF" is recorded in the de-duplication status 10062 (NO in step S603), the de-duplication program 1011 refers to the virtual storage resource allocation map information 1005 to search data at block addresses 10056 of a logical storage area 11 corresponding to block addresses 10054 of this virtual storage area 15 recorded in the virtual storage area identification information 10053, and erases duplicate data (step S604). In erasing the data, zero data is recorded in the relevant block.

The virtual storage resource management program 1010 then refers to the virtual storage resource allocation map information 1005 to clear the zero data in the block recorded in the block address 10056 in which the zero data has been recorded in step S604 and change the logical storage area identification information 10055 and the block address 10056 in the virtual storage resource allocation map information 1005 to NULL (step S605). That is, this is processing for releasing the erased area. The de-duplication program 1011 switches the de-duplication processing to ON (step S606). The de-duplication program 1011 also changes the de-duplication status 10062 corresponding to this virtual storage area 15 recorded in the virtual storage area identification information 10061 in the de-duplication status information 1006 to "ON" (step S607).

Finally, the storage subsystem 100 transmits a notification of normal completion to the management computer 500 (step S608).

<Switching of De-Duplication Processing: ON-to-OFF Switching Processing>

Figure 21:
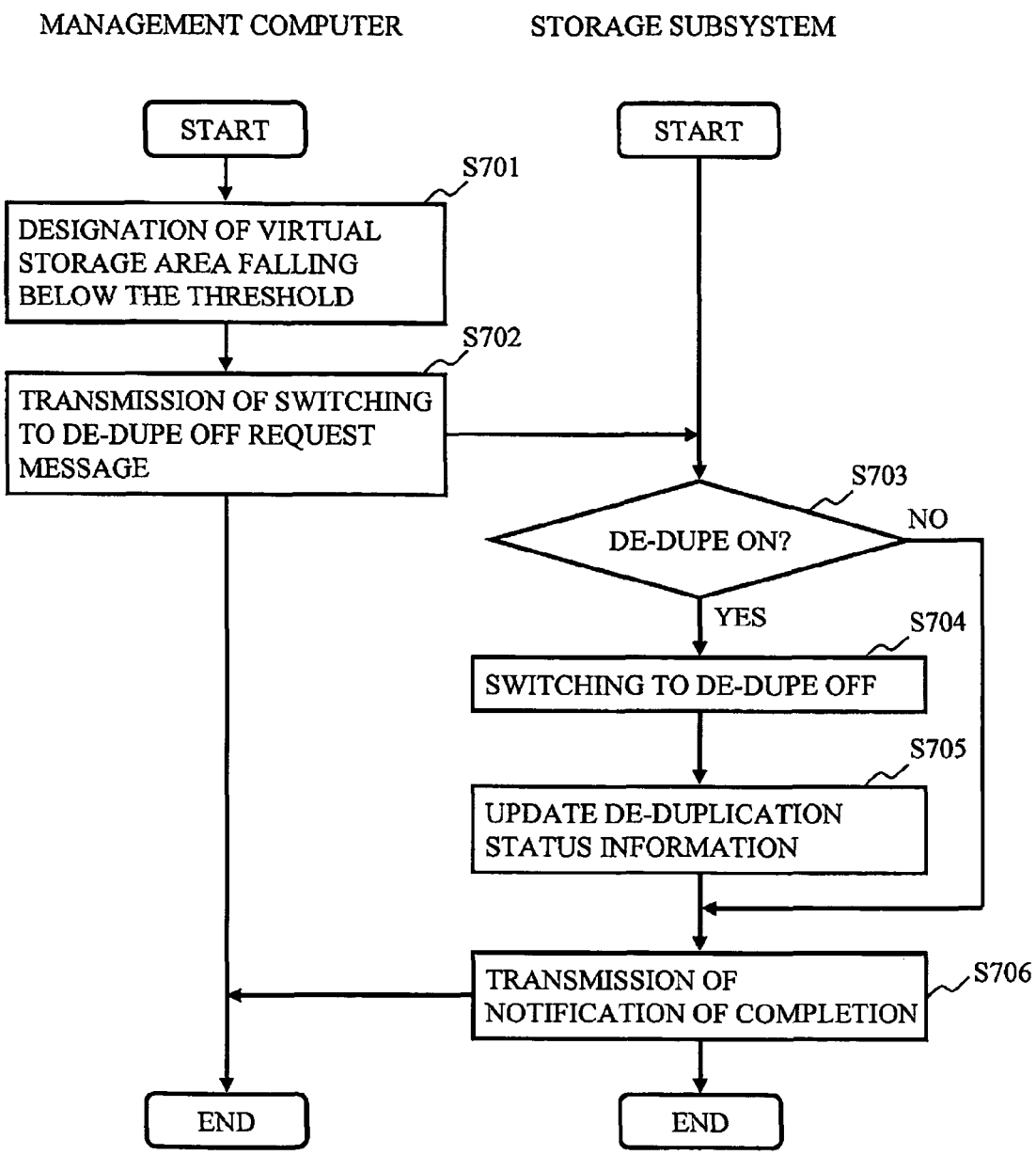
FIG. 21 is a flowchart for describing processing of switching the de-duplication processing to OFF.

FIG. 21 is a flowchart for describing processing of switching the de-duplication processing from ON to OFF in the storage subsystem 100. This processing is also performed after the processing in FIG. 19.

First, the de-duplication control program 5006 included in the management computer 500 searches the threshold management information 5001 to designate a virtual storage area 15 recorded in the virtual storage area identification information 50011 such that "THRESHOLD>REDUCTION EFFECT" (step S701). The de-duplication control program 5006 transmits a de-duplication OFF request message to the storage subsystem 100 (step S702).

The storage subsystem 100 receives the de-duplication OFF request message, and the de-duplication program 1011 included therein determines whether the de-duplication processing is applied from the de-duplication status 10062 in the de-duplication status information 1006 (step S703). If "OFF" is recorded in the de-duplication status 10062 (NO in step S703), the processing transfers to step S706.

If "ON" is recorded in the de-duplication status 10062 (YES in step S703), the de-duplication program 1011 switches the de-duplication processing to OFF (step S704). The de-duplication program 1011 changes the de-duplication status 10062 corresponding to this virtual storage area 15 recorded in the virtual storage area identification information 10061 in the de-duplication status information 1006 to "OFF" (step S705).

The storage subsystem 100 transmits a notification of normal completion to the management computer 500 (step S706).

In this configuration, when data is read, a virtual storage recorded in the virtual storage resource allocation map information 1005 needs to be referred to regardless of the de-duplication application status. Therefore, the data reading time in de-duplication mode cannot be reduced even though the de-duplication is switched to OFF. Thus, processing of effecting duplication is not specially performed for data recorded in the virtual storage area 15 before the switching in step S704.

2) Second Embodiment

A second embodiment dynamically sets the reduction effect threshold based on the utilization of the virtual storage area pools 13. The same configuration of the storage system and the same programs and control information as in the first embodiment apply.

<Setting of Reduction Effect Threshold>

Figure 22:
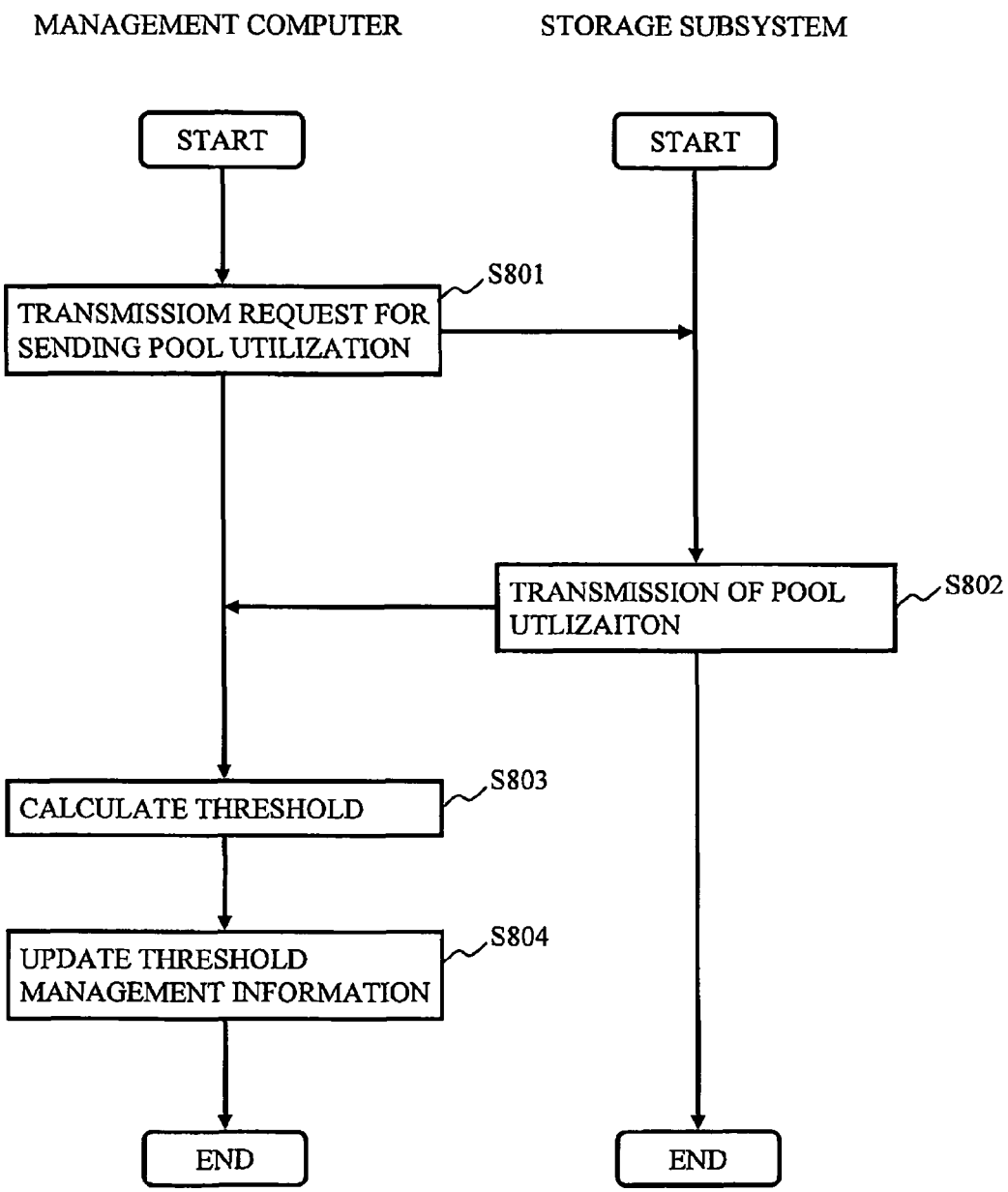
FIG. 22 is a flowchart for describing processing of setting a reduction effect threshold in the second embodiment.

FIG. 22 is a flowchart for describing processing in which the management computer 500 obtains the utilization of a virtual storage area pool 13 from the storage subsystem 100 and sets the reduction effect threshold based on the utilization.

The pool utilization information request program 5003 included in the management computer 500 refers to the threshold management information 5001 to transmit a pool utilization transmission request message for a virtual storage area 15 recorded in the virtual storage area identification information 50011 (step S801).

The storage subsystem 100 receives the pool utilization transmission request message, and the virtual storage resource management program 1010 included therein refers to the backup configuration information 1003 and the pool utilization information 1008 (FIG. 13). It transmits the utilization of a virtual storage area pool 13 corresponding to this virtual storage area 15 to the management computer 500 (step S802).

The management computer 500 receives the utilization for the virtual storage area 15, and the threshold management program 5005 included therein calculates the reduction effect threshold based on the obtained pool utilization depending on user operation (step S803). The threshold management program 5005 updates the threshold 50012 in the threshold management information 5001 (FIG. 15) (step S804).

This processing can prevent exhaustion of the capacity of the virtual storage area pool 13 by promoting the de-duplication when the pool utilization is high. However, if the exhaustion of the capacity cannot be prevented even though de-duplication is applied, measures such as increasing the capacity need to be taken.

<Processing of Calculating Reduction Effect Threshold>

Figure 23:
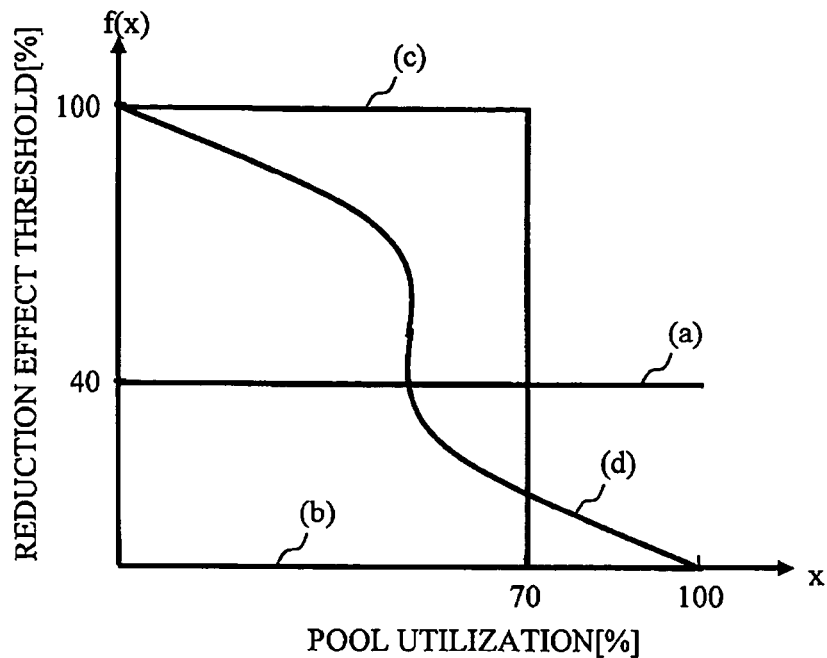
FIG. 23 is a diagram showing examples of reduction effect calculation in the second embodiment.

FIG. 23 is a diagram showing exemplary setting functions used in calculating the reduction effect threshold in step S803 of FIG. 22. The reduction effect threshold is represented as a function f(x) of the pool utilization x obtained from the storage subsystem 100.

FIG. 23 shows examples (a) to (d) of user operations and corresponding calculated reduction effect thresholds. The settings (a) to (d) may be included in the threshold management program 5001 or may be input by a user from the input interface 570 of the management computer 500.

(a) In the case where the reduction effect threshold is set as a fixed value, the reduction effect threshold is calculated not based on the pool utilization but as f(x)=40, for example. The threshold as a fixed value may be input from the input interface 570 of the management computer 500.

(b) In the case of operation where priority is put on the capacity in order to minimize the used pool capacity, the threshold is set to promote the de-duplication regardless of the pool utilization. Therefore, the threshold is calculated as f(x)=0, for example.

(c) In contrast to the case of (b), in the case of operation where priority is put on the performance, the de-duplication is not applied if the pool has an adequate capacity left. For example, the threshold is calculated as f(x)=100 (0</=x<70), and f(x)=0 (70</=x<100). Since the reference value that the pool utilization should not exceed is typically 80, it is set to 70 in this embodiment. However, it may be set to any number not smaller than 60 but smaller than 80, for example.

(d) In the case of operation where priority is put on the performance while the pool utilization is low, and where the de-duplication is gradually applied as the pool has a smaller capacity left, a cubic function is used to calculate the threshold as $f(x)=(2500(50-x))^{1/3}+50$, for example.

3) Third Embodiment

A third embodiment relates to an example in which the reduction effect threshold is set based on the frequency of accesses to the virtual storage areas 15. Other configurations are the same as in the first embodiment.

The management computer 500 periodically obtains the number of accesses to the virtual storage areas 15 from the storage subsystem 100. For volumes that are accessed more than predetermined times and used in operation where priority is put on response, the reduction effect threshold is set to 100 for example, so as not to apply the de-duplication regardless of the reduction effect. On the other hand, for volumes not having been accessed for a certain period, for example one month or more, there is no need of putting priority on the performance. Therefore, the reduction effect threshold is set to 0 to promote the de-duplication. Further, if the number of accesses has periodicity, the de-duplication may be switched between ON and OFF according to the periodicity.

To obtain the access frequency information, for example, information about the number of accesses may be set in metadata of volumes and may be incremented on every access. When the access frequency information is needed, the metadata may be checked. This is only an example and other methods (e.g., providing a table for managing the number of accesses to each volume) may be used to obtain the access frequency information.

4) Fourth Embodiment

A fourth embodiment relates to an example in which a temporal transition of the write latency (a delay time between data transfer request and actual data transfer) in a copy-destination virtual storage area 15 is output as a graph in the management computer 500, and the threshold for determining whether or not to apply the de-duplication processing is set relative to a service level. Other configurations are the same as in the first embodiment.

Figure 24:
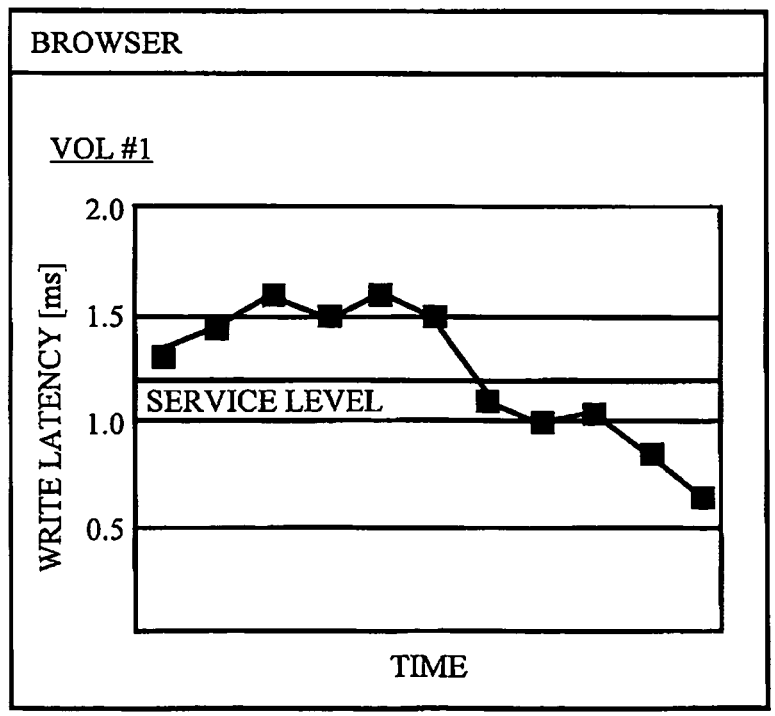
FIG. 24 is a diagram showing an exemplary output of a temporal transition graph of write latency in the fourth embodiment.

FIG. 24 is a diagram showing an exemplary graph generated by the threshold management program 5005 included in the management computer 500 and output by the output interface 575. If the threshold is set as a fixed value, the user looks at the graph to determine whether the set threshold is appropriate, and reconfigures the threshold if not appropriate.

The graph may be generated as a temporal transition of a performance parameter obtained from the storage subsystem 100 for each volume. As the performance parameter, the write latency or even the read latency or the response time may be obtained. It is assumed here that the write latency is obtained, and an exemplary graph display is shown in which the abscissa represents time and the ordinate represents the write latency. The range of the abscissa may be changed depending on the period desired to be analyzed, such as one day or one month. A reference value for the write latency is set based on a service level and shown in the graph. When the reference value is exceeded, the service level is not satisfied.

For example, if the write latency does not satisfy the service level, switching the de-duplication processing to OFF should be promoted because the performance needs to be improved. Therefore, the threshold is raised. Setting the threshold according to user operation enables threshold setting suitable for the operation.

5) Fifth Embodiment

A fifth embodiment relates to an example in which an external de-dupe appliance 400 is used to implement de-duplication writing. In the first embodiment, the storage subsystem 100 performs the de-duplication management and the virtual storage area management. In the fifth embodiment, the storage subsystem 100 is responsible for the virtual storage area management while the de-dupe appliance 400 is responsible for the de-duplication management. Other configurations are the same as in the first embodiment.

<Connection Configuration of Storage System>

Figure 25:
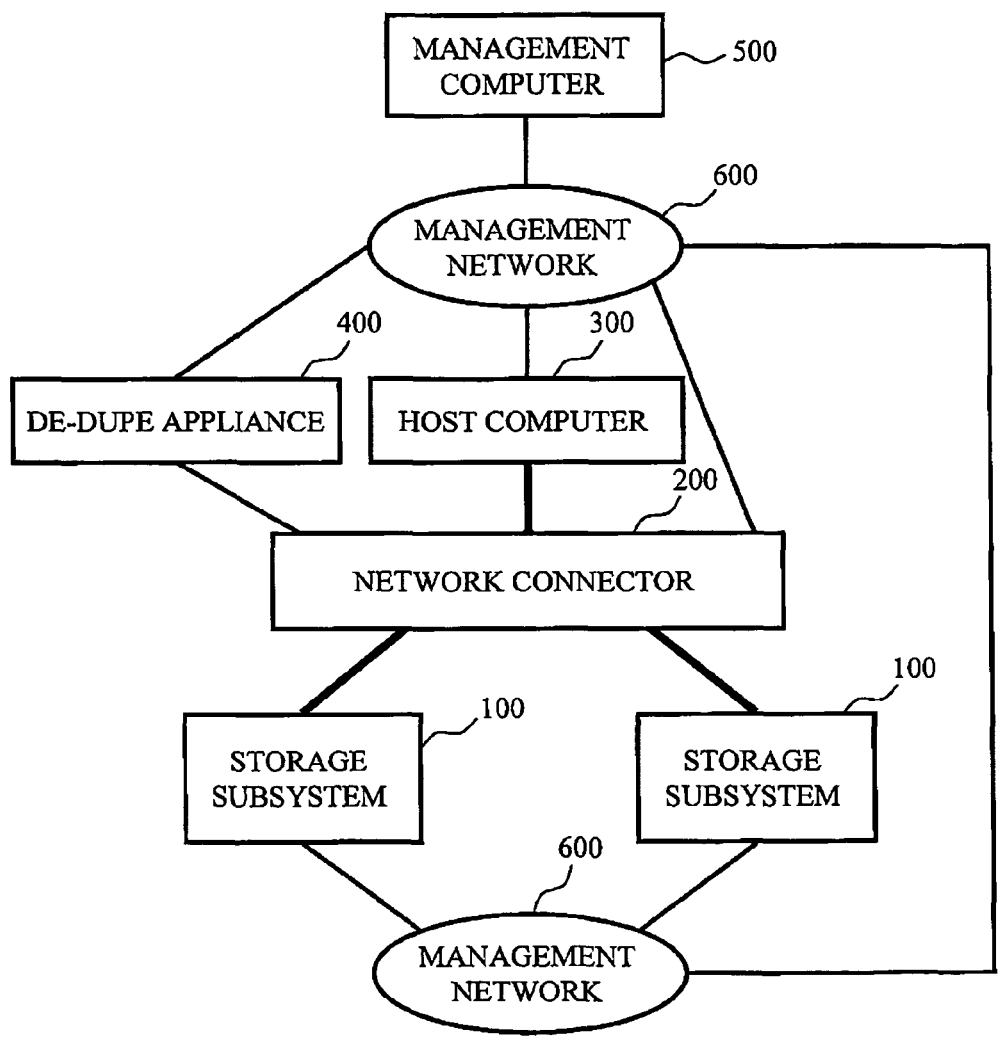
FIG. 25 is a diagram showing a schematic configuration of a storage system according to a fifth embodiment.

FIG. 25 is a diagram showing a physical connection relationship among apparatuses in a storage system according to the fifth embodiment and corresponds to FIG. 1.

As shown in FIG. 25, in addition to the connection configuration in FIG. 1, the storage system according to the fifth embodiment has the de-dupe appliance 400 that is externally-provided so that it is connected to the management network 600 and the network connector 200.

<Configuration of De-Dupe Appliance>

Figure 26:
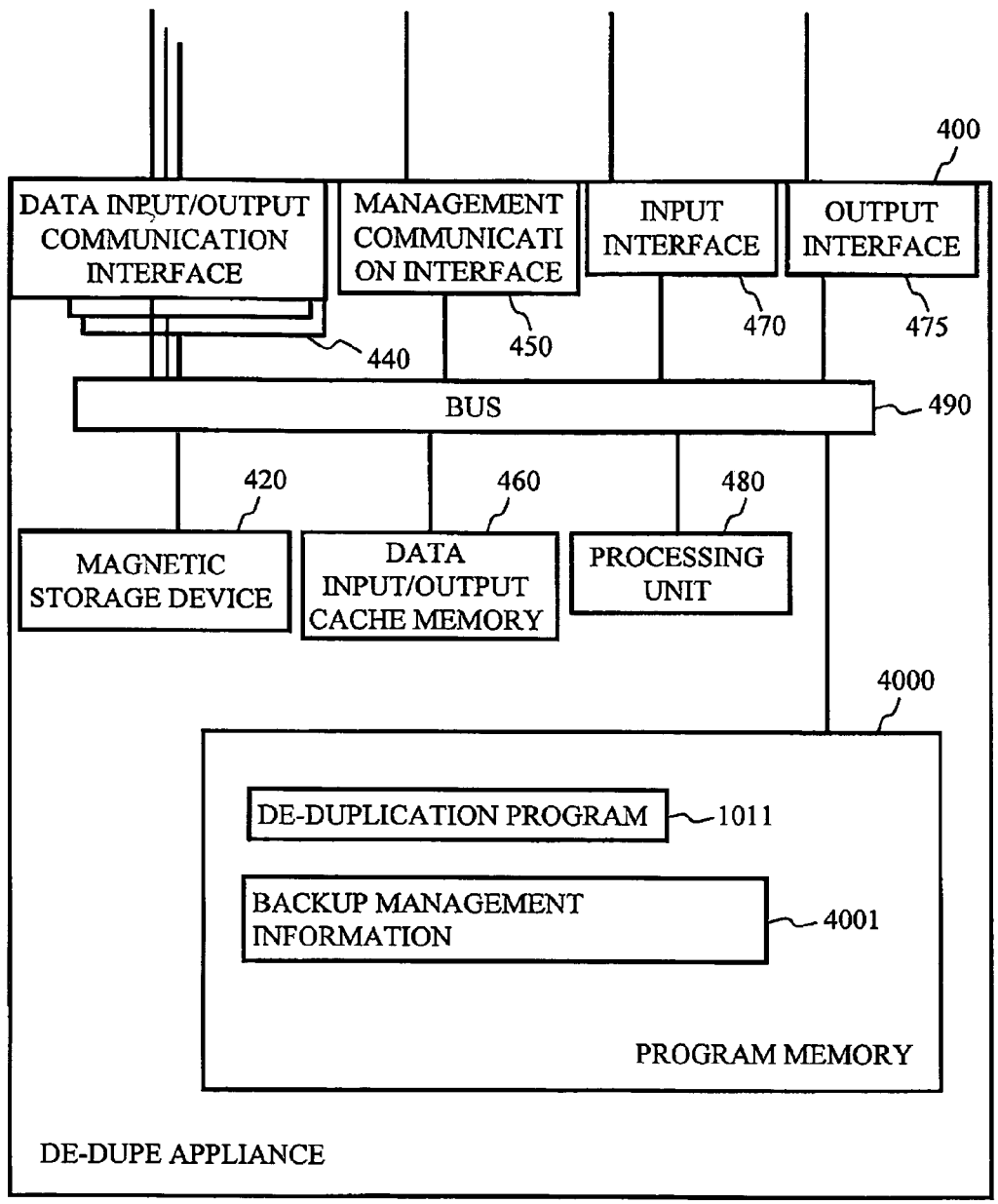
FIG. 26 is a diagram showing an internal configuration of a de-dupe appliance in the fifth embodiment.

FIG. 26 is a diagram showing an exemplary configuration of the de-dupe appliance 400. The de-dupe appliance 400 includes: data input/output communication interfaces 440 connected to the network connector 200 for performing data input/output; a management communication interface 450 connecting to the management network 600 for performing input/output of management information; an input interface 470, for example a keyboard or mouse, for an operator to input information; an output interface 475, for example a general-purpose display, for outputting information for the operator; a processing unit 480 corresponding to a CPU that performs various calculations; a magnetic storage device 420 for storing basic software such as an operating system and applications; a program memory 4000 serving as a storage space for storing programs necessary for operation of the de-dupe appliance 400; and a data input/output cache memory 460 implemented by volatile memory or the like for accelerating data input/output, wherein these components are interconnected via a communication bus 490. Thus, the hardware configuration of the de-dupe appliance 400 shown here can be implemented in a general-purpose computer (PC).

The data input/output communication interfaces 440 and the management communication interface 450 may be implemented by network input/output devices based on conventional communication technologies such as fibre channel and Ethernet™. In the present invention, it is not required to put restrictions on the number of data input/output communication interfaces 440 and the number of management communication interfaces 450. Also, the data input/output communication interfaces 440 and the management communication interface 450 may not be independent from each other. Rather, the data input/output communication interfaces 440 may be shared for input/output of management information.

The data input/output cache memory 460 is typically implemented by volatile memory but may be substituted with nonvolatile memory or a magnetic storage device. In the present invention, it is not required to put restrictions on the number of units of and the capacity of the data input/output cache memory 460.

The program memory 4000 is a memory space implemented by a magnetic storage device or volatile semiconductor memory and is used for holding basic programs and information that are necessary for operation of the de-dupe appliance 400. A control program and control information held in the program memory 4000 are as follows.

de-duplication program 1011
backup management information 4001

<Configuration of Control Information: Backup Management Information>

FIG. 27 is an exemplary configuration of the backup management information 4001 included in the de-dupe appliance 400.

Logical storage areas 11 recorded in logical storage area identification information 40013 in copy-source information 40011 store backup data at block addresses 40014. In this example, this backup data corresponds to block addresses 40016 of virtual storage areas 15 recorded in virtual storage area identification information 40015 in copy-destination information 40012. The information about the correspondence between the logical storage area identification information 40013 and the virtual storage area identification information 40015 is periodically obtained from the storage subsystem 100.

The management computer 500 transmits a de-duplication write request message to the de-dupe appliance 400.

The external de-dupe appliance 400 receives the de-duplication write request message, and the de-duplication program 1011 included therein refers to the backup management information 4001. It searches block addresses 40016 of a virtual storage area 15 corresponding to a logical storage area 11 to be backed up recorded in the logical storage area identification information 40013 to determine whether the same data as the data to be written exists. The de-duplication program 1011 performs writing only if the same data is not found. If the same data already exists, the de-duplication program 1011 does not perform writing but only updates the backup management information 4001.

According to this configuration, when the de-duplication is set to OFF, writing processing and reading processing both bypass the de-dupe appliance 400. On the other hand, when the de-duplication is set to ON, writing processing and reading processing are both performed with reference to the backup management information 4001 in the de-dupe appliance 400. Although it takes extra time for not only writing but also for reading by setting the de-duplication to ON, the load on the storage subsystem 100 is reduced by configuring according to this embodiment.

6) CONCLUSION

In the above embodiments, for each of a plurality of virtual storage areas, the capacity reduction effect where the de-duplication processing is set to ON is compared with a predetermined threshold. With reference to the result of this comparison, it is determined whether or not to switch the de-duplication processing between ON and OFF on a virtual storage area basis. Thus, the de-duplication processing can be applied if the capacity reduction effect is high. For virtual storage areas (volumes) whose capacity reduction effect is low, the storage performance can be maintained.

The capacity reduction effect is calculated and updated with predetermined timing (e.g., periodically). This allows appropriate determination of whether or not to apply the de-duplication processing depending on the status of usage.

Further, the threshold may be fixed or dynamically changed. Dynamically changing the threshold allows the capacity reduction effect and the storage performance to be appropriately balanced.

The present invention may be realized by a program code of software implementing the functions of the embodiments. In this case, a storage medium having the program code recorded thereon is provided to a system or apparatus, and a computer (or a CPU or MPU) of the system or apparatus reads out the program code stored in the storage medium. In this case, the program code itself read out from the storage medium implements the functions of the above-described embodiments, so that the program code itself and the storage medium having stored thereon the program code constitute the present invention. The storage medium for supplying such a program code may be a flexible disk, CD-ROM, DVD-ROM, hard disk drive, optical disk, magneto-optical disk, CD-R, magnetic tape, nonvolatile memory card, or ROM, for example.

An OS (operating system) or the like running on the computer may perform part or all of actual processing under instructions of the program code to implement the functions of the above-described embodiments. Further, the program code read out from the storage medium may be written to memory on the computer, and then a CPU or the like of the computer may perform part or all of actual processing under instructions of the program code to implement the functions of the above-described embodiments.

The program code of the software implementing the functions of the embodiments may be distributed over a network to be stored on storage means such as a hard disk drive or memory in a system or apparatus or to be stored on a storage medium such as a CD-RW or CD-R. When using the program code, a computer (or a CPU or MPU) of the system or apparatus may read out and execute the program code stored on the storage means or storage medium.

The invention claimed is:

1. A storage system comprising:
a storage subsystem having a plurality of storage areas for storing data; and
a management computer controlling data writing to the plurality of storage areas of the storage subsystem, wherein
for each of the plurality of storage areas, the management computer compares a capacity reduction effect of applying de-duplication processing for avoiding duplication of data writing in the storage subsystem for the storage area with a predetermined threshold, and
the storage subsystem switches the de-duplication processing between ON and OFF for each storage area based on a result of the comparison of the capacity reduction effect for the storage area with the predetermined threshold.

2. The storage system according to claim 1, wherein
the management computer has a threshold management table for managing information about the predetermined threshold and the capacity reduction effect for each of the plurality of storage areas, and
the storage subsystem has a de-duplication application management table for managing current statuses of applying the de-duplication processing for the plurality of storage areas, and wherein
if the de-duplication processing is set to OFF in the de-duplication application management table for a storage area for which the comparison result is determined as the threshold</=the capacity reduction effect, the storage subsystem switches the de-duplication processing from OFF to ON for the storage area, and
if the de-duplication processing is set to ON in the de-duplication application management table for a storage area for which the comparison result is determined as the threshold>the capacity reduction effect, the storage subsystem switches the de-duplication processing from ON to OFF for the storage area, and wherein
the storage subsystem calculates the capacity reduction effect for each of the plurality of storage areas by using information about the number of entries of block addresses and information about the number of de-duplicated block addresses and notifies the management computer of a result of the calculation with predetermined timing, and the management computer reflects the received calculation result in the threshold management table.

3. The storage system according to claim 1, wherein the storage subsystem has a de-duplication application management table for managing current statuses of applying the de-duplication processing for the plurality of storage areas, and switches the de-duplication processing between ON and OFF based on the de-duplication application management table and the comparison result.

4. The storage system according to claim 2, wherein if the de-duplication processing is set to OFF in the de-duplication application management table for a storage area for which the comparison result is determined as the threshold</=the capacity reduction effect, the storage subsystem switches the de-duplication processing from OFF to ON for the storage area.

5. The storage system according to claim 2, wherein if the de-duplication processing is set to ON in the de-duplication application management table for a storage area for which the comparison result is determined as the threshold>the capacity reduction effect, the storage subsystem switches the de-duplication processing from ON to OFF for the storage area.

6. The storage system according to claim 4, wherein when switching the de-duplication processing from OFF to ON, the storage subsystem erases duplicate data in the storage area and replaces the data with NULL.

7. The storage system according to claim 1, wherein the management computer has a threshold management table for managing information about the predetermined threshold and the capacity reduction effect for each of the plurality of storage areas, the storage subsystem calculates the capacity reduction effect for each of the plurality of storage areas by using information about the number of entries of block addresses and information about the number of de-duplicated block addresses and notifies the management computer of a result of the calculation with predetermined timing, and the management computer reflects the received calculation result in the threshold management table.

8. The storage system according to claim 7, wherein the management computer has the predetermined threshold as a fixed value.

9. The storage system according to claim 7, wherein the management computer determines the predetermined threshold depending on a frequency of accesses to each of the plurality of storage areas.

10. The storage system according to claim 7, wherein the management computer determines the predetermined threshold depending on pool utilization in each of the plurality of storage areas.

11. The storage system according to claim 1, wherein the management computer, instead of comparing the capacity reduction effect with the predetermined threshold, compares any one of a plurality or performance parameters including write latency, read latency, and response time with a desired service level, and the storage subsystem switches the de-duplication processing between ON and OFF on a storage area basis based on a result of the comparison of the performance parameter with the desired service level.

12. A method of controlling a storage system, the storage system comprising:
    a storage subsystem having a plurality of storage areas for storing data; and
    a management computer controlling data writing to the plurality of storage areas of the storage subsystem, and the method comprising:
    in the management computer, for each of the plurality of storage areas, comparing a capacity reduction effect of applying de-duplication processing for avoiding duplication of data writing in the storage subsystem for the storage area with a predetermined threshold; and
    in the storage subsystem, switching the de-duplication processing between ON and OFF for each storage area based on a result of the comparison of the capacity reduction effect for the storage area with the predetermined threshold.

13. The method according to claim 12, wherein the management computer has a threshold management table for managing information about the predetermined threshold and the capacity reduction effect for each of the plurality of storage areas, and the storage subsystem has a de-duplication application management table for managing current statuses of applying the de-duplication processing for the plurality of storage areas, the method comprising:
    in the storage subsystem, if the de-duplication processing is set to OFF in the de-duplication application management table for a storage area for which the comparison result is determined as the threshold</=the capacity reduction effect, switching the de-duplication processing from OFF to ON for the storage area;
    if the de-duplication processing is set to ON in the de-duplication application management table for a storage area for which the comparison result is determined as the threshold>the capacity reduction effect, switching the de-duplication processing from ON to OFF for the storage area;
    calculating the capacity reduction effect for each of the plurality of storage areas by using information about the number of entries of block addresses and information about the number of de-duplicated block addresses and notifying the management computer of a result of the calculation with predetermined timing; and
    in the management computer, reflecting the calculation result received from the storage subsystem in the threshold management table.

14. A program for controlling a storage system, the storage system comprising:
    a storage subsystem having a plurality of storage areas for storing data; and
    a management computer controlling data writing to the plurality of storage areas of the storage subsystem, wherein the program causes the management computer to perform, for each of the plurality of storage areas, processing of comparing a capacity reduction effect of applying de-duplication processing for avoiding duplication of data writing in the storage subsystem for the storage area threshold with a predetermined threshold, and
    the program causes the storage subsystem to perform processing of switching the de-duplication processing between ON and OFF for each storage area based on a result of the comparison of the capacity reduction effect for the storage area with the predetermined threshold.

* * * * *